US 011915000B2

(12) United States Patent
Yasin et al.

(10) Patent No.: US 11,915,000 B2
(45) Date of Patent: Feb. 27, 2024

(54) APPARATUSES, METHODS, AND SYSTEMS TO PRECISELY MONITOR MEMORY STORE ACCESSES

(71) Applicant: Intel Corporation, Santa Clara, CA (US)

(72) Inventors: Ahmad Yasin, Haifa (IL); Raanan Sade, Kibutz Sarid (IL); Liron Zur, Haifa (IL); Igor Yanover, Yokneam Illit (IL); Joseph Nuzman, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/160,600

(22) Filed: Jan. 27, 2023

(65) Prior Publication Data

US 2023/0176870 A1 Jun. 8, 2023

Related U.S. Application Data

(63) Continuation of application No. 17/862,708, filed on Jul. 12, 2022, now abandoned, which is a
(Continued)

(51) Int. Cl.
*G06F 9/30* (2018.01)
*G06F 9/54* (2006.01)
(Continued)

(52) U.S. Cl.
CPC ...... *G06F 9/30145* (2013.01); *G06F 9/30098* (2013.01); *G06F 9/544* (2013.01);
(Continued)

(58) Field of Classification Search
None
See application file for complete search history.

(56) References Cited

U.S. PATENT DOCUMENTS

| 5,185,871 A | 2/1993 | Frey et al. |
| 5,724,536 A | 3/1998 | Abramson et al. |

(Continued)

FOREIGN PATENT DOCUMENTS

| CN | 1973261 A | 5/2007 |
| EP | 3109761 B1 | 3/2018 |

(Continued)

OTHER PUBLICATIONS

Arm, "User Guide", Arm(registered) Streamline, Version 7.1, 2019, pp. 1-137.

(Continued)

*Primary Examiner* — Steven G Snyder
(74) *Attorney, Agent, or Firm* — NICHOLSON DE VOS WEBSTER & ELLIOTT LLP

(57) ABSTRACT

Systems, methods, and apparatuses relating to circuitry to precisely monitor memory store accesses are described. In one embodiment, a system includes a memory, a hardware processor core comprising a decoder to decode an instruction into a decoded instruction, an execution circuit to execute the decoded instruction to produce a resultant, a store buffer, and a retirement circuit to retire the instruction when a store request for the resultant from the execution circuit is queued into the store buffer for storage into the memory, and a performance monitoring circuit to mark the retired instruction for monitoring of post-retirement performance information between being queued in the store buffer and being stored in the memory, enable a store fence after the retired instruction to be inserted that causes previous store requests to complete within the memory, and on detection of completion of the store request for the instruction in the memory, store the post-retirement performance information in storage of the performance monitoring circuit.

27 Claims, 18 Drawing Sheets

Related U.S. Application Data continuation of application No. 16/729,374, filed on Dec. 28, 2019, now Pat. No. 11,392,380.

(51) Int. Cl.
    *G06F 11/34*         (2006.01)
    *G06F 11/30*         (2006.01)

(52) U.S. Cl.
    CPC .......... *G06F 9/546* (2013.01); *G06F 11/3037* (2013.01); *G06F 11/348* (2013.01)

(56) References Cited

U.S. PATENT DOCUMENTS

| | | | |
|---|---|---|---|
| 5,751,986 | A | 5/1998 | Fetterman et al. |
| 6,233,657 | B1 | 5/2001 | Ramagopal et al. |
| 6,412,057 | B1 | 6/2002 | Sasahara et al. |
| 6,651,151 | B2 | 11/2003 | Palanca et al. |
| 6,678,810 | B1 | 1/2004 | Palanca et al. |
| 7,552,302 | B1 | 6/2009 | Tene et al. |
| 8,069,444 | B2 | 11/2011 | Fedorova |
| 8,171,261 | B2 | 5/2012 | Palanca et al. |
| 8,959,314 | B2 | 2/2015 | Palanca et al. |
| 9,058,415 | B1 * | 6/2015 | Serebrin ............... G06F 11/302 |
| 9,098,268 | B2 | 8/2015 | Palanca et al. |
| 9,342,310 | B2 | 5/2016 | Palanca et al. |
| 9,342,433 | B2 | 5/2016 | Yasin et al. |
| 9,383,998 | B2 | 7/2016 | Palanca et al. |
| 9,465,680 | B1 | 10/2016 | Chynoweth et al. |
| 9,612,835 | B2 | 4/2017 | Palanca et al. |
| 9,965,375 | B2 | 5/2018 | Merten et al. |
| 9,971,603 | B2 | 5/2018 | Yasin et al. |
| 10,303,477 | B2 | 5/2019 | Doshi |
| 10,445,237 | B1 | 10/2019 | Scott |
| 10,489,158 | B2 | 11/2019 | Wang et al. |
| 10,754,782 | B1 | 8/2020 | Pham et al. |
| 11,175,916 | B2 | 11/2021 | Smaus et al. |
| 11,210,099 | B2 | 12/2021 | Doshi |
| 11,256,506 | B2 * | 2/2022 | Yasin .................. G06F 9/30076 |
| 11,392,380 | B2 * | 7/2022 | Yasin .................. G06F 11/3419 |
| 11,768,683 | B2 * | 9/2023 | Yasin .................. G06F 9/30076 712/226 |
| 2008/0059712 | A1 | 3/2008 | Fedorova |
| 2008/0141002 | A1 * | 6/2008 | Bhargava ............ G06F 11/3476 712/220 |
| 2009/0300294 | A1 | 12/2009 | Moyer et al. |
| 2010/0246815 | A1 | 9/2010 | Olson et al. |
| 2010/0250964 | A1 | 9/2010 | Olson et al. |
| 2011/0276760 | A1 | 11/2011 | Chou |
| 2011/0276790 | A1 | 11/2011 | Olson et al. |
| 2011/0296142 | A1 | 12/2011 | Olson et al. |
| 2012/0159502 | A1 | 6/2012 | Levin et al. |
| 2013/0332705 | A1 | 12/2013 | Martinez et al. |
| 2014/0129776 | A1 | 5/2014 | Kaplan et al. |
| 2014/0143500 | A1 * | 5/2014 | Moyer ................ G06F 12/0895 711/133 |
| 2016/0019062 | A1 * | 1/2016 | Yasin .................... G06F 9/3887 712/226 |
| 2016/0092223 | A1 | 3/2016 | Wang et al. |
| 2016/0378467 | A1 | 12/2016 | Doshi |
| 2018/0004521 | A1 | 1/2018 | Kleen et al. |
| 2019/0220417 | A1 | 7/2019 | Williamson et al. |
| 2019/0278599 | A1 | 9/2019 | Doshi |
| 2020/0142629 | A1 | 5/2020 | Yasin et al. |
| 2021/0200547 | A1 * | 7/2021 | Yasin .................. G06F 9/30145 |
| 2022/0308882 | A1 * | 9/2022 | Combs ................ G06F 11/3495 |
| 2023/0082290 | A1 * | 3/2023 | Yasin .................. G06F 9/30145 |

FOREIGN PATENT DOCUMENTS

| | | |
|---|---|---|
| JP | 2015-072717 A | 4/2015 |
| WO | 2016/048592 A1 | 3/2016 |
| WO | 2018/004974 A1 | 1/2018 |

OTHER PUBLICATIONS

Drongowski, Paul J., "Instruction-Based Sampling: A New Performance Analysis Technique for AMD Family 10h Processors", Advanced Micro Devices Inc., Nov. 16, 2007, pp. 1-14.

Final Office Action, U.S. Appl. No. 16/729,374, dated Sep. 8, 2021, 23 pages.

Lin, Changhui et al., "Address-aware Fences", ACM International Conference on Supercomputing, Jun. 2013.

Non-Final Office Action, U.S. Appl. No. 17/862,708, dated Dec. 28, 2022, 18 pages.

Non-Final Rejection dated Jan. 12, 2021 for U.S. Appl. No. 16/729,374.

Notice of Allowance, U.S. Appl. No. 16/729,374, dated Mar. 31, 2022, 9 pages.

Willhalm et al., "Intel Performance Counter Monitor—A Better Way to Measure CPU Utilization", Available Online at <https://software.intel.com/en-us/articles/intel-performance-counter-monitor>, Aug. 16, 2012, 35 pages.

Yasin, Ahmad, "A Top-Down Method for Performance Analysis and Counters Architecture", IEEE International Symposium on Performance Analysis of Systems and Software (ISPASS), vol. 1, Mar. 2014, pp. 1-10.

* cited by examiner

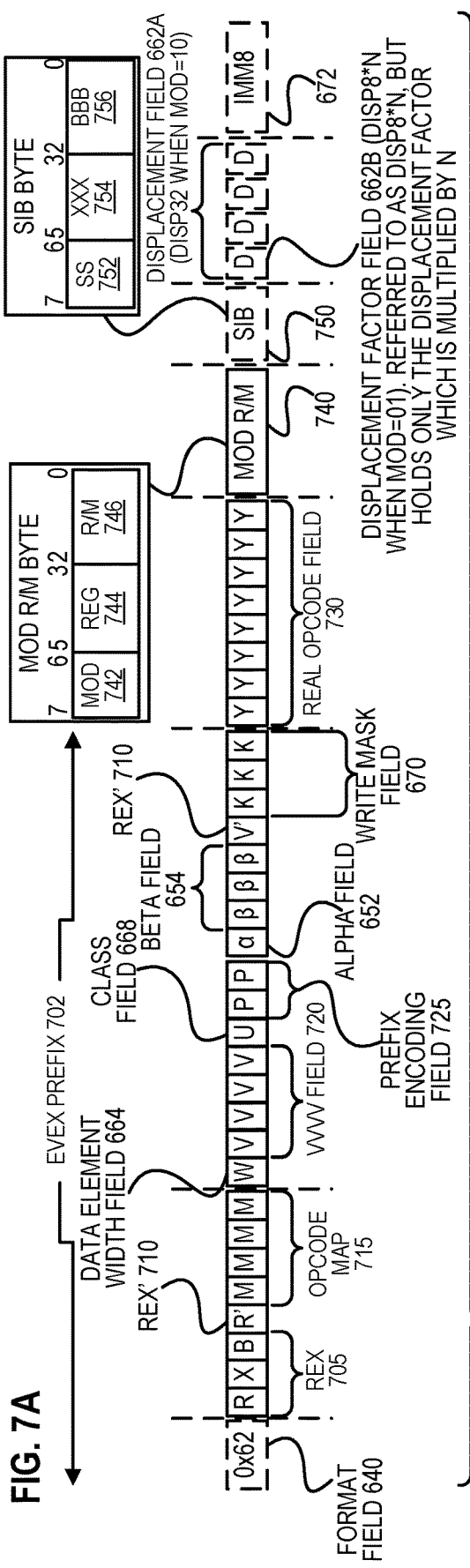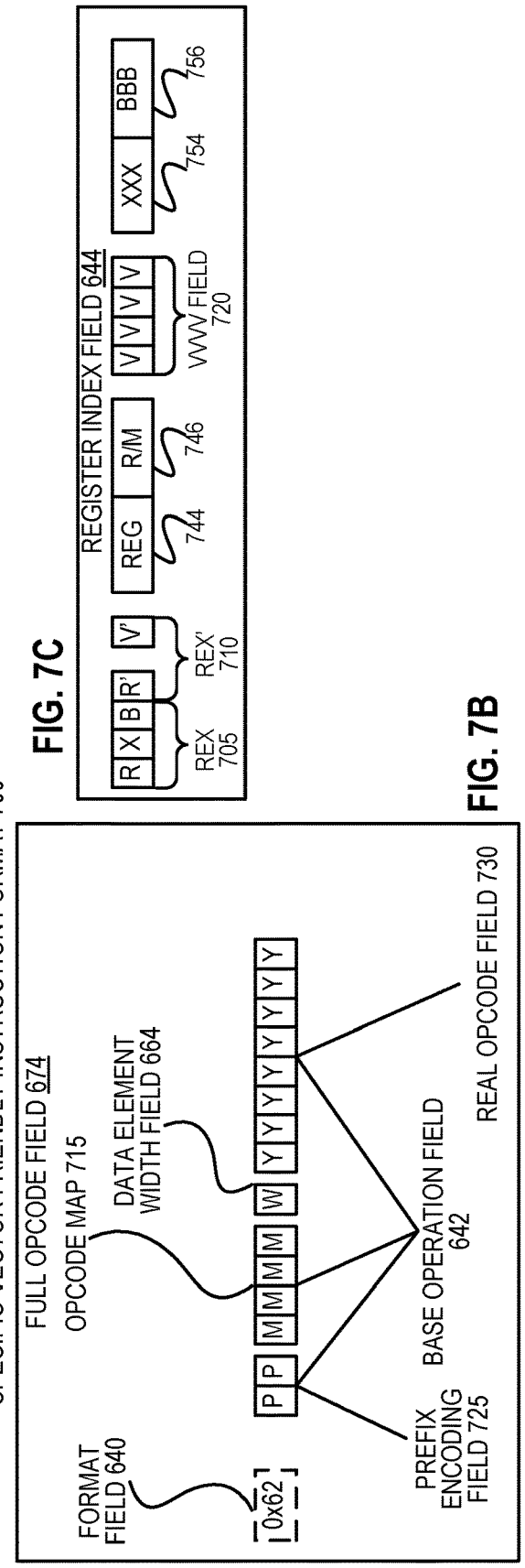

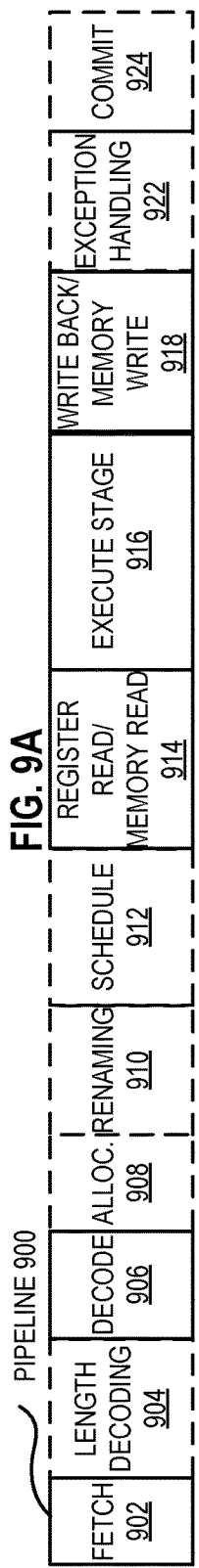
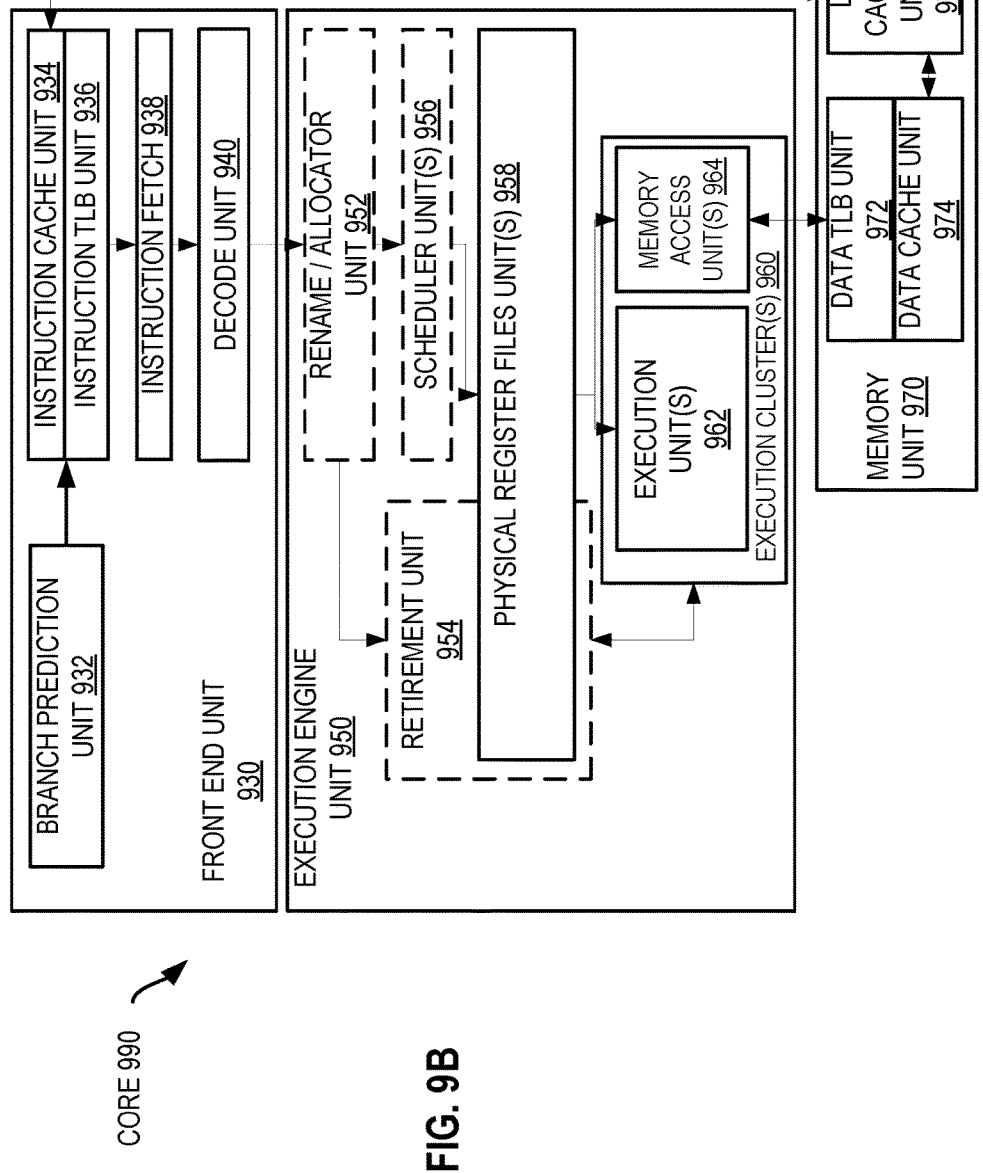

APPARATUSES, METHODS, AND SYSTEMS TO PRECISELY MONITOR MEMORY STORE ACCESSES

CROSS-REFERENCE TO RELATED APPLICATIONS

This application is a continuation of U.S. patent application Ser. No. 17/862,708 filed Jul. 12, 2022, which is a continuation of U.S. patent application Ser. No. 16/729,374 filed Dec. 28, 2019, now U.S. Pat. No. 11,392,380, each of which is incorporated herein by reference in its entirety.

TECHNICAL FIELD

The disclosure relates generally to electronics, and, more specifically, an embodiment of the disclosure relates to circuitry to precisely monitor memory store accesses.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decode circuit decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 7A is a block diagram illustrating fields for the generic vector friendly instruction formats in FIGS. 6A and 6B according to embodiments of the disclosure.

FIG. 7B is a block diagram illustrating the fields of the specific vector friendly instruction format in FIG. 7A that make up a full opcode field according to one embodiment of the disclosure.

FIG. 7C is a block diagram illustrating the fields of the specific vector friendly instruction format in FIG. 7A that make up a register index field according to one embodiment of the disclosure.

FIG. 9A is a block diagram illustrating both an exemplary in-order pipeline and an exemplary register renaming, out-of-order issue/execution pipeline according to embodiments of the disclosure.

FIG. 9B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

Figure 1:
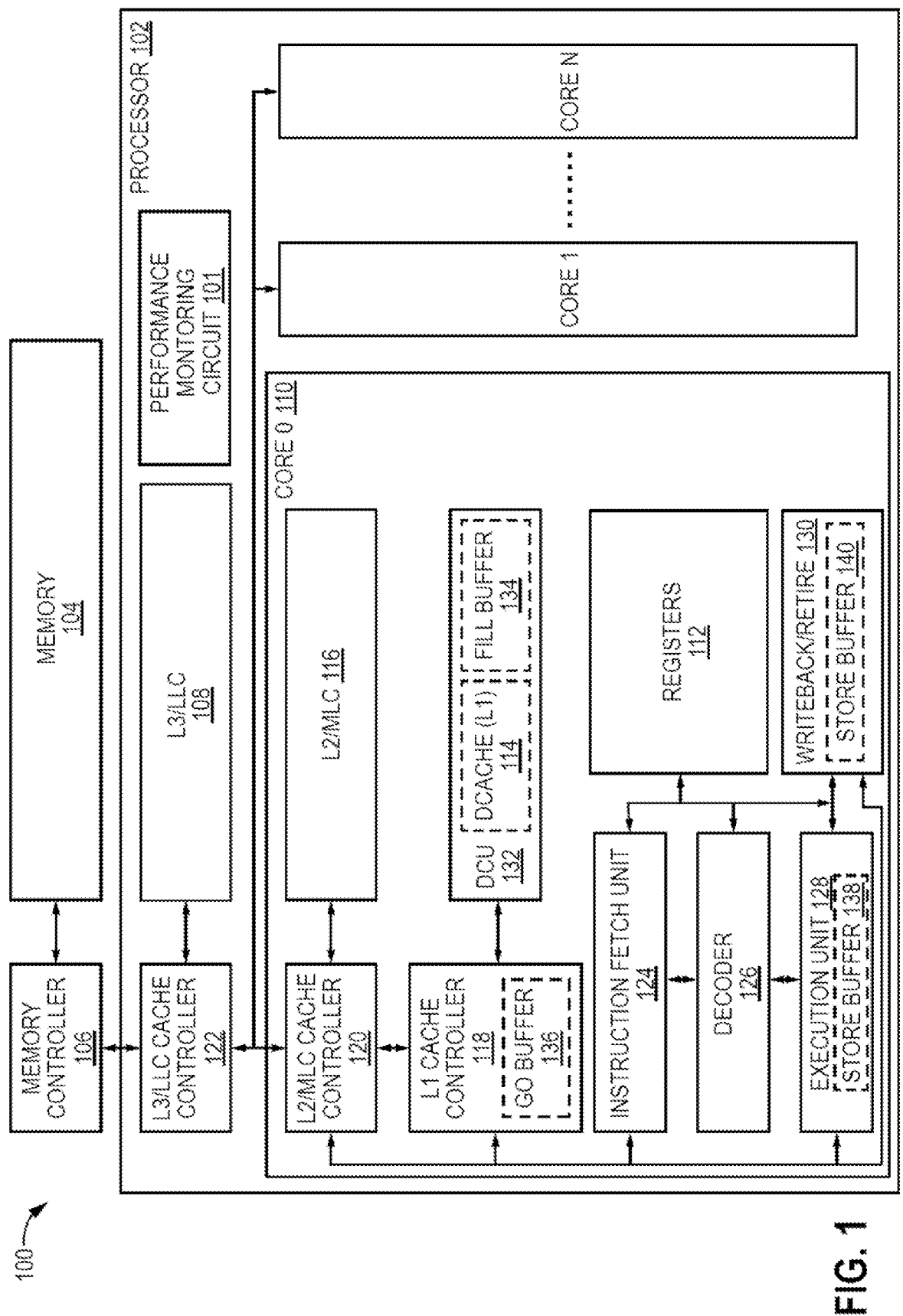
FIG. 1 illustrates a hardware processor coupled to memory according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A processor may operate on data stored in memory of a computing system, e.g., in performing arithmetic or logic functions. An instruction may include a request to read data (e.g., load) and/or a request to write data (e.g., a store). In certain embodiments, the data is one or more cache lines of data. In one embodiment, a cache line may generally refer to a section (e.g., a sector) of memory (e.g., a cache) that is managed as a unit for coherence purposes. Data may be stored in a processor's cache (e.g., of any level, such as, but not limited to, L3, L2, L1, etc.), system memory (e.g., separate from a processor), or combinations thereof. In certain embodiments, memory is shared by multiple cores of a processor or local (e.g., not shared) to each core of a processor. A cache (e.g., cache memory) may generally refer to a memory buffer inserted between one or more processor cores and a bus/interconnect therebetween, for example, the cache to store (e.g., hold) currently active copies of data (e.g., cache lines of data from system (e.g., main) memory). Cache may be local to each processor. Additionally or alternatively, a (e.g., next level of) cache may be shared by multiple processors, e.g., separate from each processor. Memory may be separate from any cache memory, e.g., system memory that is off-die relative to a processor core. In one embodiment, a cache line is a 64 byte sized section of memory, e.g., 64 byte granularity.

Cache (e.g., line) coherency may generally refer to each cache (e.g., cache memory) and/or other (e.g., system) memory in the coherence domain observing all modifications of that same cache data (e.g., a cache line, and more particularly, each instance of that cache line that is to contain the same data). For example, a modification may be said to be observed by a cache when any subsequent read would return the newly (e.g., current) written value. In certain embodiments, a cache controller (e.g., cache coherency controller) is included in a computing system to maintain cache coherency. In one embodiment, the cache controller is a cache controller circuit. Cache coherency may be maintained according to a cache coherence protocol, e.g., the four state modified (M), exclusive (E), shared (S), and invalid (I) (MESI) protocol or the five state modified (M), exclusive (E), shared (S), invalid (I), and forward (F) (MESIF) protocol. Cache controller(s) may provide, for multiple copies of a data item (e.g., stored in any memory), an update to other copies of the data item when one copy of that data item is changed, e.g., to ensure the data values of shared items (e.g., operands) are propagated throughout the computing system in a timely fashion.

In certain embodiments, a store (e.g., write) may only be performed if the cache line to be written (e.g., that cache line being stored in multiple physical locations) is in the Modified or Exclusive state. In certain embodiments, if the cache line to be written is in the Shared state, all other cached copies must be invalidated first. In one embodiment, the invalidation is caused by a broadcast operation known as a Request For Ownership (RFO). In certain embodiments, a cache that holds a line in the Modified state must snoop (e.g., intercept) all attempted reads (e.g., from all of the other caches in the system) of the corresponding (e.g., main) memory location and insert the data that it holds. In one embodiment, this is done by forcing the read to back off (e.g., retry later), then writing the data to (e.g., main) memory and changing the cache line to the Shared state. In another embodiment, this is done by sending data from the Modified cache to the cache performing the read. In certain embodiments, snooping is only required for read misses (e.g., a coherency protocol that ensures that Modified cannot exist if any other cache can perform a read hit). In one embodiment, a cache that includes a cache line in the Shared state must listen for invalidate or request-for-ownership broadcasts from other caches, and discard the line (e.g., by moving it into Invalid state) on a match. In certain embodiments, the Modified and Exclusive states are always precise in that they match the true cache line ownership situation in the system. In certain embodiments, the Shared state may be imprecise, e.g., if another cache discards a Shared line, this cache may become the sole owner of that cache line, but it will not be promoted to Exclusive state. In one embodiment, other caches do not broadcast notices when they discard cache lines, and this cache could not use such notifications without maintaining a count of the number of shared copies. Thus, in certain embodiments, the Exclusive state is an opportunistic optimization, e.g., if the processor wants to modify a cache line that is in a Shared state, a memory (e.g., bus or interconnect) transaction is necessary to invalidate all other cached copies. In one embodiment, the Exclusive state enables modifying a cache line with no memory (e.g., bus or interconnect) transaction.

A store (e.g., a memory access for a request to store certain data) may be treated differently than a load (e.g., a memory access for a request to load certain data), for example, a load may not be processed after retirement stage of a (e.g., out-of-order) processor but a store may be processed after retirement stage. However, precise sampling mechanisms may be tightly coupled with retirement stage in order to capture precise monitoring information (e.g., instruction address of a load miss). Thus, it is a challenge to provide precise monitoring information for stores (e.g. a precise counter when a store (e.g., store instruction) misses in a (e.g., last level before system memory) cache.

The embodiments herein allow for precise monitoring (e.g., x86) of memory store accesses. The embodiments herein enhance the profiling of stores accesses, for example, improving visibility into performance and optimizations in a memory subsystem (e.g. multiple-level memory, such a two-level memory). The embodiments herein overcoming certain difficulties in debugging performance issues when memory stores are involved. Stores may be more difficult to monitor that loads because in certain embodiments: (i) there is no instruction in code (e.g., a program) including the store that explicitly consumes the output (e.g., in contrast to how certain loads of data are needed by dependent operations), (ii) certain out-of-order processors execute stores post retirement (e.g., commit) stage (e.g., which challenges facilities like timed last branch records in capturing their penalties), but there are multiple microarchitectural techniques that avoid delays to implicitly dependent operations, e.g., store-to-load data forwarding or memory disambiguation) that further complicate the task to determine when a store is limiting performance, and (iii) certain processors provide no or very limited information that may be useful to distinguish specific critical—from non-critical-stores, e.g., the information may be limited to non-precise information or precise architectural-only information (e.g., instruction or data address). Examples of non-precise events are a counter (e.g., RESOURCE_STALLS.STORE_BUFFER or .SB counter) that counts cycles when a store buffer (SB) is full, e.g., to use the counter value to determine the ratio of that counter value as compared to the elapsed core (e.g., central processing unit) cycles; hit and/or miss indications for read-for-ownership (RFO) stores in a (e.g., certain level) cache (e.g., L2_RQSTS.RFO data) (e.g., a speculative event), and/or system (e.g., system-on-a-chip (SoC)) memory information (e.g. hit/miss indication in a certain level of cache (e.g., off core cache)) for read-for-ownership (RFO) stores (e.g., OFFCORE_RESPONSE data) (e.g., a speculative event) and may include prefetching. However, in certain embodiments, a counter (e.g., RESOURCE_STALLS.STORE_BUFFER or RESOURCE_STALLS. SB counter) that counts cycles when a store buffer (SB) may be a symptom when a store buffer fills up, for example, it does not necessary mean stores are a critical bottleneck, e.g. other resource can fill up in conjunction with the SB being full (which may or may not have a performance counter to identify if that is the case); and/or hit and/or miss indications for read-for-ownership (RFO) stores in a (e.g., certain level) cache (e.g., L2_RQSTS.RFO data) and/or system memory information for read-for-ownership (RFO) stores (e.g., OFFCORE_RESPONSE data) are speculative which make them hard to correlate to store instructions of the program. In one embodiment, the problem gets even worse when a critical store is buffered behind other stores which means the non-precise samples would be tagged further away from their originating instructions. Furthermore, these may include some hardware prefetched RFOs which adds false positives.

A performance monitoring circuit may provide a log of precise architectural information, such as, instruction address (e.g., EIP/RIP), data linear address (DLA), translation lookaside buffer (TLB) misses, splits, and/or lock access. However, the architectural precise information may not be sufficient for common performance issues, for example, a user may desire/need to know microarchitectural information such as whether a store has missed in a cache (e.g., per level of multiple levels), whether the store has forced a snoop to other cores (e.g., precise latency for store accesses, such as, but not limited to HIT latency from a snoop from the L2 of another core or HITM latency that the snoop is a hit in the shared (e.g., L3) cache). Additionally, latency of the specific critical store may also be useful for performance optimization (e.g. how far ahead to place a prefetch operation (e.g., instruction) to prefetch data into a cache(s) if such a prefetch would mitigate the stall(s)).

Certain embodiments herein overcome the above challenges, e.g., including (i)-(iii). Certain embodiments herein do or do not periodically select a random instruction fetch (e.g., or micro-operation), records detailed performance information, including instruction and data addresses, and generates an interrupt. Certain of those embodiments capture whether the instruction has a store, the data address and memory-type of the access, but do not provide (e.g., correct) microarchitectural information. Certain embodiments herein are used in a performance monitoring circuit that includes precise event-based sampling (PEBS). Certain embodiments herein provide information in addition to the precise architectural information discussed above. Certain embodiments herein extend a baseline profiling mechanism to provide precise information for stores (e.g., store memory accesses). Such extension may include: a precise instruction pointer (IP) of the store access (e.g., with no skid caused by interrupt latency), architectural information including a data address of the store access, covering complex instruction set computer (CISC) instructions (e.g., with multiple store micro-operations for a single macro-instruction), lock/atomic access information, microarchitectural information including the data-source (e.g., per cache-level hit/miss), TLB hit/miss, and other attributes for the store, and/or latencies of the memory access (e.g. cache latency, instruction latency, TLB miss latency, etc.) Certain embodiments herein provide novel circuitry and methods to retrieve critical monitoring information, e.g., including post-retirement information when involving multiple components (e.g., units/circuits) in an out-of-order processor. Certain embodiments herein provide post-retirement performance information that is used to optimize code, e.g., based on converting stalled memory slots into retired slots. Certain embodiments herein provide post-retirement performance information include a store's instruction pointer, data address, latency and attributes for the memory access itself. This data may be essential for performance analysis and optimization in out-of-order microarchitectures. Certain embodiments herein focus on non-speculative demand stores, e.g., where having precise events with data address for both loads and stores provides a complete picture of memory references. The following are sample use cases for use of the post-retirement performance information: finding cache-line conflicts on a non-uniform memory access (NUMA) system (e.g., using HitM's), data layout (to improve cache locality) including structure ordering/splitting and global data ordering, and/or identifying and eliminating remote references (e.g., remote memory node, remote cache accesses, far (e.g., instead of near) memory access).

Next is a discussion of an example system 100 in FIG. 1 including a performance monitoring circuit 101. FIG. 1 illustrates a hardware processor 102 coupled to a memory 104 according to embodiments of the disclosure. In one embodiment, the memory is a system memory (e.g., dynamic random access memory (DRAM)). Memory controller 106 may be included, e.g., to manage memory requests between the processor 102 and memory 104. In one embodiment, memory controller 106 is to provide data (e.g., a cache line) for a miss in the cache(s) (e.g., miss in L3 or other last level cache (LLC) 108 of processor 102). Processor 102 may include one or more processor cores, e.g., 0 to N where N is a positive integer. In one embodiment, each of a plurality of processor cores have an instance of the circuitry, etc. depicted and/or discussed in reference to core 110 in FIG. 1.

Depicted core 110 includes a set of registers 112, a first level cache (level one (L1)) 114 (e.g., data cache (Dcache), and a level two (L2) or mid-level cache (MLC) 116. In some embodiments, as shown in FIG. 1, a processor 102 includes a next level (e.g., level three (L3) cache or last level cache (LLC) 108 (e.g., the last cache searched before a data item is fetched from memory 104) that is coupled to, and shared by, one or more (e.g., all) of the cores. In certain embodiments, each of L1 114, L2/MLC 116, and L3/LLC 108 caches are managed by a respective cache controller (188, 120, 122, respectively) (e.g., cache controller circuitry) to cache data (e.g., and/or instructions) according to a specified cache coherency, e.g., as discussed above. In certain embodiments, the instructions and data stored within the various processor caches are managed at the granularity of cache lines which may be a fixed size (e.g., 64, 128, 512, etc. Bytes in length). Core 110 further includes an instruction fetch unit 124 for fetching instructions (for example, from (e.g., main) memory 104 via memory controller 106 and/or from the shared LLC 108 via L3/LLC cache controller 122); a decoder 126 (e.g., decode circuit or decode unit) for decoding the instructions (e.g., decoding program instructions into micro-operations or "µops"); an execution unit 128 (e.g., execution circuit) for executing the decoded instructions; and a writeback/retire circuit 130 (e.g., writeback/retire unit) for retiring the instructions and writing back the results. Although separate cache controllers for each layer are depicted, it should be understood that a single cache controller that controls a plurality of (e.g., all) cache layers (e.g., and other components utilizing cache coherency) may be utilized. In certain embodiments, a core is an instance of core 990 in FIG. 9B.

Depicted core 110 in FIG. 1 includes a data cache unit 132. Data cache unit 132 may include a data (e.g., L1) cache 114 and/or fill buffer 134. In certain embodiments, the data cache unit 132 is to receive a request to perform a memory access (e.g., a store or load), for example, from execution unit 128 and/or writeback/retire circuit 130. As one example, a processor (e.g., via execution of an instruction) may have a plurality of store requests (e.g., to store a resultant of an operation(s) by instructions). A store buffer may be included. In one embodiment, execution unit 128 includes optional store buffer 138. In one embodiment, writeback/retirement circuit (e.g., unit) 130 includes optional store buffer 140. In one embodiment, a store buffer (e.g., either of store buffer 138 or store buffer 140) maintains (e.g., serializes) stores (e.g., store requests which may also include the payload to be stored at a target cache line) in (e.g., program) order (and not the order of execution, which may be out-of-order) to ensure in (e.g., program) order updates to the memory (e.g., caches). In certain embodiments, a processor is placed in total store order (TSO) mode to enable use of the store buffer(s), etc. Store buffer may be a first in, first out buffer (FIFO), e.g., with the stores provided to the FIFO buffer in program order.

In certain embodiments, a store (e.g., store request) is sent from the generating component (e.g., execution unit) to a memory component (e.g., cache controller) to perform the store operation. In one embodiment, stores are sent to data cache unit 132, for example, to data cache (L1) 114 to check if there is a hit for the store. In one embodiment, a store request includes an identifier of a location (e.g., an address) to perform the store operation. In certain embodiments, a hit occurs for a cache when it is determined that the cache includes a copy of the data for the location.

In certain embodiments, a store request is sent to the data cache (DCache) 114, and if there is a miss (e.g., not a hit), then that store request is sent to fill buffer 134 for servicing. Fill buffer 134 (e.g., or a miss status handling register (MSHR)) may have one of its plurality of entries (e.g., slots) assigned to the missed store request, and a process of obtaining access to be able to write the data to the store location is begun. In one embodiment, a request for ownership (RFO) is sent (e.g., from the fill buffer) into the memory subsystem (e.g., to a cache that currently has write access for the location the data is to be stored to) and a confirmation response is sent back when the storage location for the miss is allowed to be written to. A confirmation response may be a confirmation value that indicates the cache 114 now has ownership over the other location (e.g., other cache) that does store data for the location, and the store request may now be serviced (e.g., by writing that data to a cache line in data cache 114 and propagating that data to any other caches that have instances of that cache line). Processor 102 may also include a globally observable (GO) buffer 136, which is depicted as being in the L1 cache controller 118. GO buffer 136 may be provided to keep track of the program order for the misses (e.g., store requests that did not hit in the data cache being targeted). In one embodiment, the information from the GO buffer 136 is then used to cause (e.g., guarantee) store updates to the targeted cache (e.g., cache 114) in program order. In certain embodiments, a "globally observable buffer" stores (e.g., in program order) data (e.g., store requests) that is waiting to be made architecturally visible to all components sharing a memory subsystem, e.g., a globally observable store buffer (GoSB) for stores that are waiting to be made architecturally visible. In certain embodiments, a "globally observable buffer" stores (e.g., in program order) a list of all outstanding stores (e.g., in slots of the GO buffer) that wait for their "request for ownership" response (e.g., a response that indicates ownership that allows a store of data to a corresponding cache line).

In certain embodiments, when a plurality of stores that miss in the cache(s) is interleaved with a group of stores that hit in the cache(s,) the stores are serialized to ensure in (e.g., program) order updates to the memory subsystem (e.g., including other caches and/or memory 104).

In one embodiment where stores are dispatched from the store buffer in (e.g., program) order, a store that hits the cache and is stalled also causes all subsequent stores to be stalled. In one embodiment, multiple stores that miss in the data cache unit (DCU) can be handled in parallel as long as the core has enough Fill Buffer (FB) entries (or MSHR entries), to buffer them. After the stores are observed in the (e.g., cache coherency) system, which can happen out-of-order, certain embodiments herein serialize stores according to the program order to ensure they update the memory system in the correct order. In other embodiments, the circuitry used to handle this serialization does not include stores that hit in the DCU currently.

One or more of the controllers may include a translation lookaside buffer (TLB), e.g., storing the (e.g., recent) translations of virtual memory addresses to physical memory addresses.

In certain embodiments, a store buffer resides in a memory access unit (e.g., memory access unit 964 in FIG. 9B). In certain embodiments, data cache unit 132 is data cache unit 974 in FIG. 9B. In certain embodiments, store buffer 138 (or 140) includes a plurality of slots for entries. Each slot of store buffer may receive an outstanding store request, e.g., from a requestor such as an execution circuit (e.g., unit) or writeback/retirement circuit (e.g., unit), and store the store requests in program order. If a store misses the data cache unit 132 in one embodiment, it allocates an entry in the fill buffer 134, and the fill buffer 134 (e.g., as caused by a cache controller) sends a Request For Ownership (RFO) to the remaining memory system (e.g., L3/LLC 108 in FIG. 1). Fill buffer may include any plurality of slots for miss entries.

As noted above, it may be desirable to monitor one or more events, e.g., that occur after retirement for a store and up to the store being completed in memory. For example, where a system assumes that an instruction that is retired will be stored into memory and thus proceeds with retiring the instruction before the store is complete in its final destination, e.g., assuming that the store buffer (e.g., and other circuitry) will complete the outstanding store in its final destination.

In certain embodiments, performance monitoring circuit 101 is included to monitor certain information, for example, post-retirement information for one or more stores to storage in system 100. Although performance monitoring circuit 101 is shown in processor 102, it should be understood that it may be located in other components, e.g., and may be distributed such as to be in more than one component.

In certain embodiments, performance monitoring circuit 101 (e.g., performance monitoring unit (PMU)) (e.g., features a PEBS functionality) reports precise monitoring information disclosed herein, e.g., triggered by a performance counter overflow. In one embodiment, performance monitoring circuit 101 reports the architectural state (e.g., including instruction pointer (IP)) for the specific instruction at which the counter has fired. Microarchitectural information may be also included in the case of a demand load accesses missing the L3 cache (e.g., MEM_LOAD_RETIRED.L3 MISS). Performance monitoring data can provide valuable information to software developers and performance engineers that is used to optimize the software/application of interest. Certain embodiments herein provide performance monitoring data for stores (e.g., in addition to merely having a counter for number of store instructions). Performance monitoring data may include cache miss information for stores. In certain embodiments, a new precise performance monitoring data (e.g., MEM_TRANS_RETIRED_STORE_SAMPLE data) (e.g., as a specific event code/programming in a software exposed register) is included and may be used to enable reporting of the new performance monitoring information. In one embodiment, multiple components inside the processor 102 (e.g., system 100) collectively work together to provide the performance monitoring data discussed herein, e.g., as depicted in FIG. 3.

Figure 2:
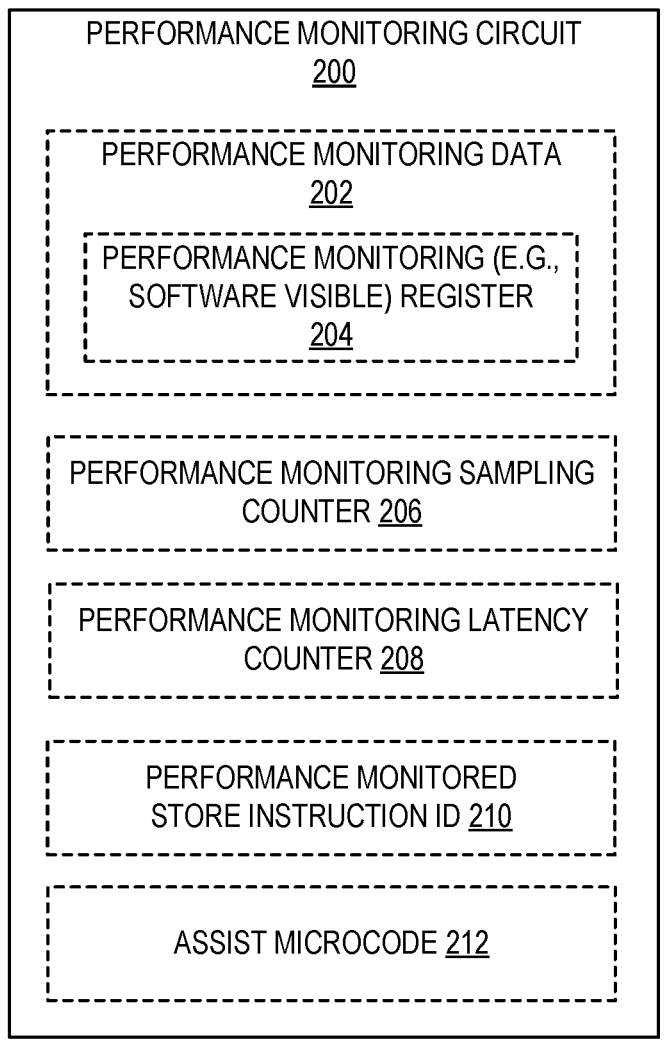
FIG. 2 illustrates a performance monitoring circuit according to embodiments of the disclosure.

FIG. 2 illustrates a performance monitoring circuit 200 according to embodiments of the disclosure. In one embodiment, performance monitoring circuit 101 in FIG. 1 is an instance of performance monitoring circuit 200.

Performance monitoring circuit 200 may include one or more of (e.g., any combination of): performance monitoring data 202 storage, which may include a performance monitoring (e.g., software visible) register 204, a performance monitoring sampling counter 206, a performance monitoring latency counter 208, a performance monitored store instruction identification (ID) value 210 storage, or assist microcode 212 (e.g., storage and/or trigger). In one embodiment, performance monitoring data 202 storage stores post-retirement performance information for stores, e.g., collected by performance monitoring circuit 200 and/or other components (e.g., the component(s) in FIG. 1). In one embodiment, performance monitoring (e.g., software visible) register 204 is readable by software (e.g., but not writable by software). Software may include an operating system (OS) and/or application code (e.g., in user mode instead of supervisor mode). Performance monitoring (e.g., software visible) register 204 may be one of registers 112 in FIG. 1. In one embodiment, a performance monitoring sampling counter 206 is included to trigger a read of performance monitoring data (e.g., from the components being monitored), for example, post-retirement performance information for stores. Counter 206 may store a (e.g., predetermined) threshold and trigger monitoring of a particular store (e.g., after a threshold number of stores have been counted). Counter 206 may count the stores that are input into a store buffer. The counter may reset (e.g., to zero) after reaching the threshold. In one embodiment, a performance monitoring latency counter 208 counts the number of cycles (e.g., core cycles) between certain events, for example, between a store being input or dispatched from a store buffer and events occurring afterwards. The counter may reset after being read, e.g., by performance monitoring circuit 200. In one embodiment, performance monitoring circuit 200 sets a value (e.g., ID) in performance monitored store instruction identification (ID) value 210 storage to track the current store that is being monitored. In one embodiment, performance monitoring circuit 200 includes assist microcode 212 to store microcode and/or trigger microcode that is to cause certain operations, e.g., the inserting of a memory fence (e.g., a store memory fence). An example sequence diagram is discussed next in reference to FIG. 3.

Figure 3:
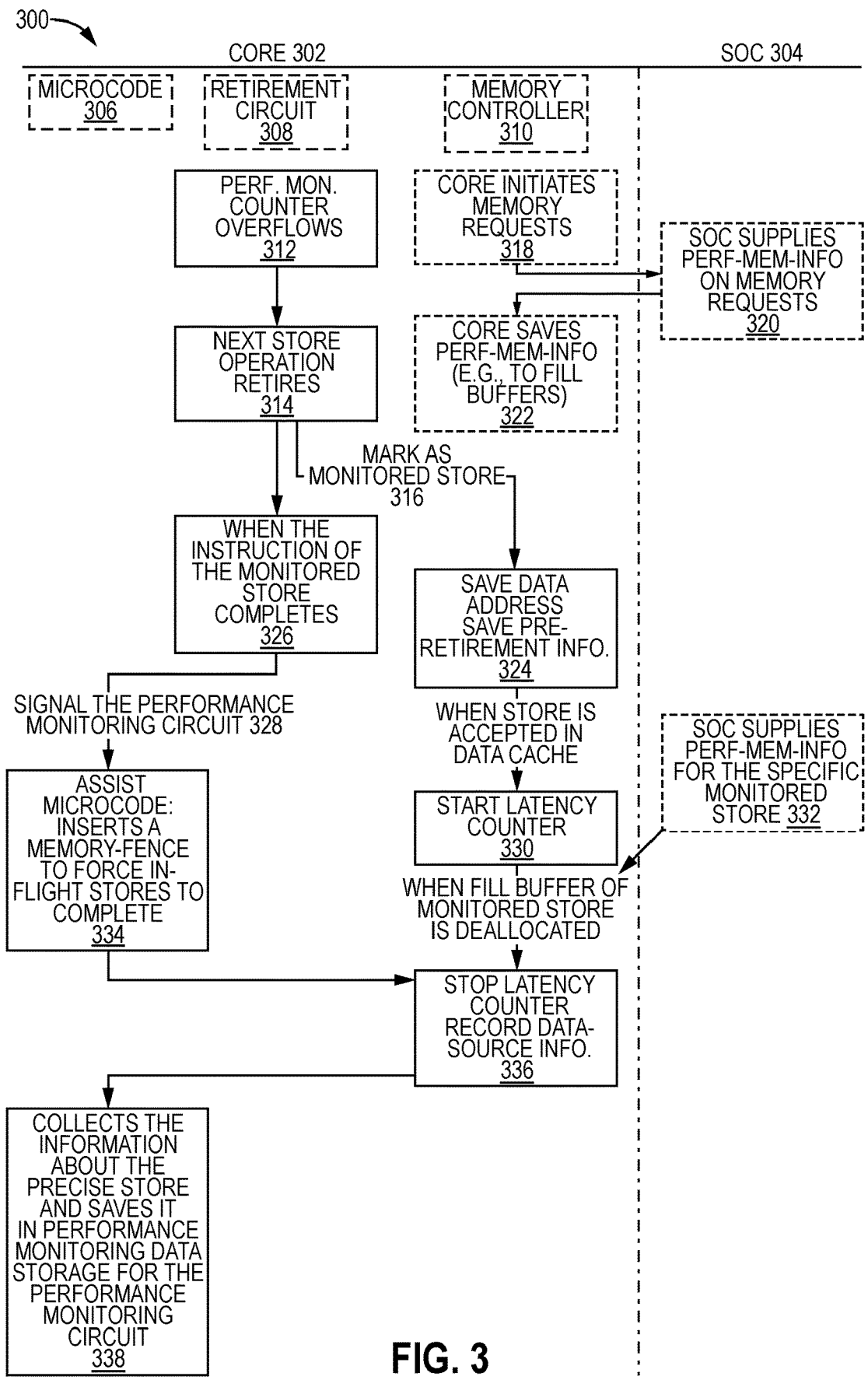
FIG. 3 illustrates a sequence diagram for performance monitoring of a store request according to embodiments of the disclosure.

FIG. 3 illustrates a sequence diagram 300 for performance monitoring of a store request according to embodiments of the disclosure. In sequence diagram 300, the microcode 306 may be assist microcode 212 in FIG. 2, the core 302 may be a core as discussed herein (e.g., core 110 in FIG. 1), the retirement circuit may be a retirement circuit (e.g., unit) discussed herein (e.g., retirement circuit 130 in FIG. 1), memory controller 310 may be any one or more of the memory controllers discussed herein (e.g., in reference to FIG. 1), and/or SoC 304 may be any system/SoC discussed herein (e.g., system 100 in FIG. 1). In one embodiment, SoC 304 is the memory 104 and/or memory controller 106 in FIG. 1. In one embodiment, memory controller 310 is memory controller 122 in FIG. 1 or memory controller 106 in FIG. 1.

In certain embodiments, performance monitoring of stores is enabled and retirement circuit 312 counts the number of stores (e.g., store request) that is receives and sets a counter (e.g., performance monitoring sampling counter 206 in FIG. 2) accordingly for each store. At 312, the counter overflows and thus is to trigger the monitoring of a particular store (e.g., the next store) 314, e.g., and marks the store as monitored at 316 (for example, stores a value into performance monitored store instruction identification (ID) value 210 storage in FIG. 2). Marking of the store may being the monitoring (e.g., recording) of performance information discussed herein.

After marking a particular store (e.g., with a tag) to be monitored at 316, memory controller may then save the data address and/or pre-retirement information 324.

In certain embodiments, when the instruction causing the store completes at 326, the performance monitoring circuit is signaled at 328, and causes execution of an assist microcode at 334 (e.g., assist microcode 306 or assist microcode 212 in FIG. 2). In one embodiment, the assist microcode inserts a memory-fence to force (e.g., in-flight) stores (for example, stores that have not yet completed, e.g., stores that have been sent to a store buffer but are not yet completed in memory) to complete within the memory (e.g., as the final destination for that store operation). In certain embodiments, when the store is accepted into a data cache (e.g., from the store buffer) a latency counter (e.g., latency counter 208 in FIG. 2) is started at 330. In certain embodiments, memory controller 310 (e.g., memory controller 106 in FIG. 1 for storage into memory 104 or memory controller 122 in FIG. 1 for storage into L3/LLC 108) is to, for a monitored store, cause SoC 304 to send performance monitoring information (e.g., memory related information) for the monitored store request 332 (e.g., and send that information to core to save it (e.g., to temporarily save it into memory controller 310). In one embodiment, when fill buffer (e.g., fill buffer 134 in FIG. 1) deallocates its storage of the store being monitored, the latency counter is stopped at 336, for example, also causing the recording of the data-source information (e.g., which level of the memory/cache the data was stored into, etc. as discussed herein). This may also cause stopping of the recording of further performance information for the monitored store.

At 338, the microcode 306 may also cause the collection of the performance monitoring information (e.g., only information for the store being monitored and not other stores, loads, etc.), and the storage of that information (e.g., post-retirement performance information) (e.g., into performance monitoring data 202 (e.g., register 204) in FIG. 2).

The information may then be utilized, e.g., to improve the performance of the system.

In certain embodiments, performance monitoring circuit (e.g., enabling of the monitoring of post-retirement performance information for stores) is triggered when stores are indicated as a bottleneck in a top-down system (e.g., pipeline) analysis.

In one embodiment, the memory subsystem (e.g., outside of the core) sends back performance monitoring information (e.g., memory related information) for every core initiated memory request that indicates performance monitoring information about the access. For example, whether the store was satisfied (hit) by a certain (e.g., L3) cache, or by (e.g., local or remote) memory, near or far memory, etc.

In certain embodiments, memory controller 310 (e.g., memory controller 106 in FIG. 1 for storage into memory 104 or memory controller 122 in FIG. 1 for storage into L3/LLC 108) is to receive memory requests 318 and send the memory request to SoC 304 (e.g., memory thereof) for servicing, wherein SoC 304 supplies performance monitoring information (e.g., memory related information) for the memory request 320, and sends that information to core to save it at 322 (e.g., to save it into a fill buffer, such as, but not limited to, fill buffer 134 in FIG. 1).

In one embodiment, software programs the (e.g., MEM_TRANS_RETIRED.STORE_SAMPLE) performance monitoring circuit (e.g., event) to count all architecturally-visible retired memory store instructions, e.g., in counter 206 in FIG. 2, for example, when the system (e.g., processor) is in PEBS mode. In one embodiment, the monitoring (e.g., event) is implemented in the retirement circuit (e.g., retirement unit) when only retired (non-speculative) stores are to be counted.

In one embodiment, when the counter overflows (or pre-overflow), the performance monitoring circuit is to tag the very next store instruction (or the instruction causing the overflow) which is marked as a monitored store (e.g., as MonitoredStore) towards the memory subsystem. In one embodiment, stopping on the very next store access including the precise distribution accuracy (PDIR) is critical so that every store access in the program has a chance to be sampled. Certain embodiments herein enable sampling a specific memory access within a single instruction that can encapsulate multiple memory accesses (for example, a vector scatter instruction, such as, but not limited to, a vector scatter on double-precision floating-point values (VSCATTERDPD) instruction). In one embodiment, when the instruction to which the monitored store belongs completes (e.g., when an End Of Macro (EOM) retires), the retirement circuit causes execution of assist microcode to cease retirement of a program's normal instructions.

In one embodiment, when the microcode assist is triggered, it inserts a memory-fence to force all (e.g., in-flight) store accesses (for example, stores that have been, or are about to be, sent to memory from a store buffer, e.g., but are not yet completed) to complete within the memory subsystem. In certain embodiments, this allows for precise microarchitectural information to be retrieved, for example, where stores are buffered and handled by memory post-retirement phase. In certain embodiments, once the fence completes, microcode collects all selected (e.g., related) information about the monitored store and saves it (e.g., in the memory-resident buffer using the MEMORY_INFO fields of adaptive PEBS sampling or in a model specific register (MSR) in another case) such that software can consume it, e.g., later.

In one embodiment, when the memory unit (e.g., memory controller) first receives the "monitored store" indication from a retirement circuit, it saves aside the data address(es) of that store as well as other pre-retirement information that may be collected for the store such as, but not limited to, hit/miss in TLB, is it a locked access?, is it a split access?, etc. In certain embodiments, when the monitored store is successfully handled by the cache or memory (e.g. after completing all previous stores) and it leaves the (e.g., senior) store buffer, a latency counter is started that measures the cache and/or memory latency in core cycles till the store is fully completed (e.g., the store is completed within its final destination).

In certain embodiments, if the store misses the (e.g., L1) data cache (e.g., in a data cache unit (DCU)) it may allocate/merge into a fill buffer (FB), which may also be referred to as a cache-miss handling buffer in the literature) that tracks handling with further levels of the memory until completion. In certain embodiments, when the entry for the store in the fill buffer is deallocated (e.g., after the response, and possibly data phases, are received from the servicing cache/memory), the latency counter is stopped. In certain embodiments, the data-source (e.g., that identifies the unit/level inside memory subsystem that satisfied the store) is also saved.

Thus, the embodiments herein allow for performance monitoring of special cases such as a streaming or write-combining store (e.g., that have no read-for-ownership phase), lock stores, or cacheline split stores.

Figure 4:
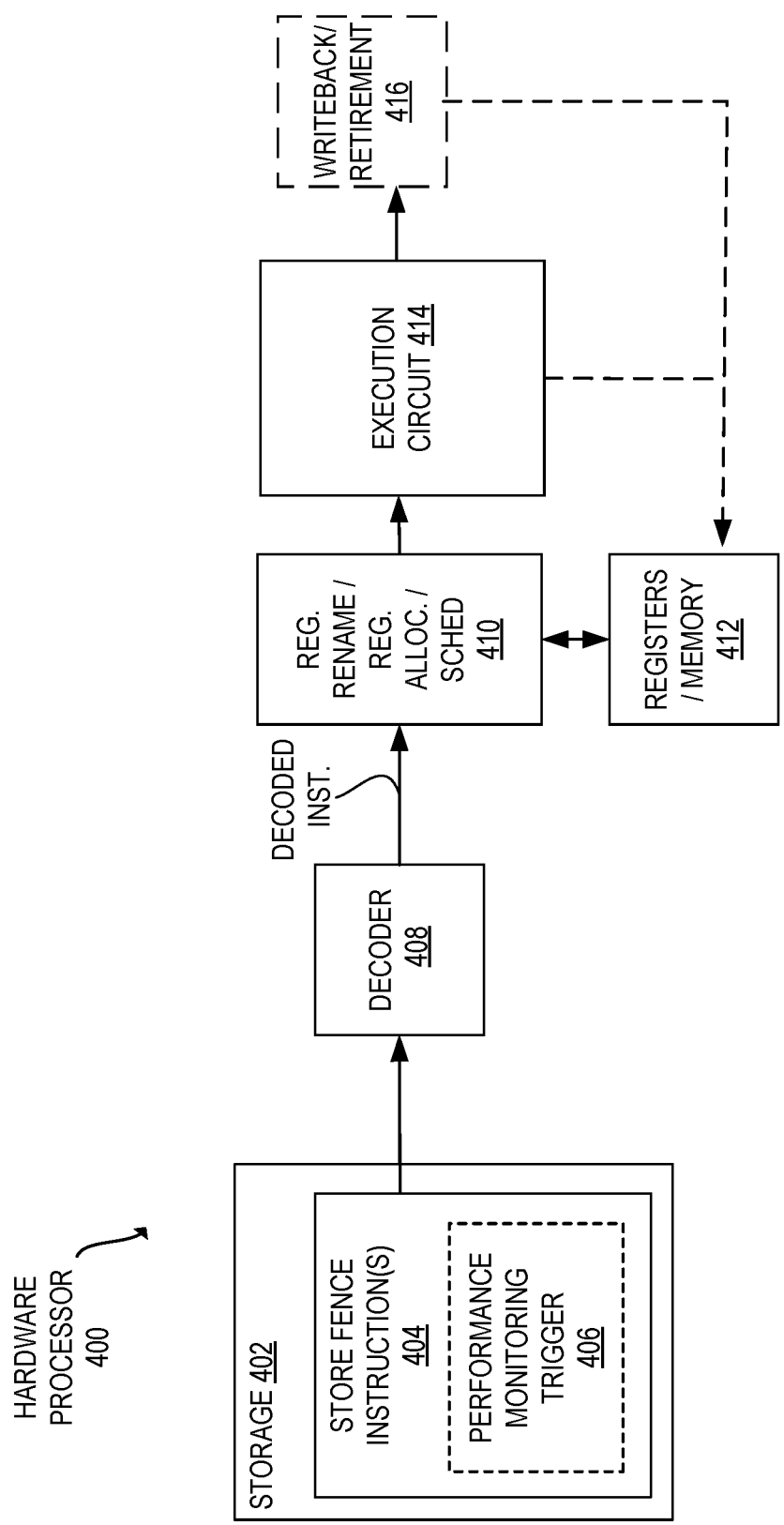
FIG. 4 illustrates a hardware processor, coupled to storage that includes one or more store fence instructions according to embodiments of the disclosure.

FIG. 4 illustrates a hardware processor 400, coupled to storage that includes one or more store fence instructions 404 according to embodiments of the disclosure. In certain embodiments, a store fence instruction is according to any of the disclosure herein. In certain embodiments, store fence instruction is caused to be executed by assist microcode discussed herein.

In one embodiment, e.g., in response to a request to perform an operation, the instruction (e.g., macro-instruction) is fetched from storage 402 and sent to decoder 408. In the depicted embodiment, the decoder 408 (e.g., decoder circuit) decodes the instruction into a decoded instruction (e.g., one or more micro-instructions or micro-operations). The decoded instruction is then sent for execution, e.g., via scheduler circuit 410 to schedule the decoded instruction for execution.

In certain embodiments, (e.g., where the processor/core supports out-of-order (OoO) execution), the processor includes a register rename/allocator circuit 410 coupled to register file/memory circuit 412 (e.g., unit) to allocate resources and perform register renaming on registers (e.g., registers associated with the initial sources and final destination of the instruction). In certain embodiments, (e.g., for out-of-order execution), the processor includes one or more scheduler circuits 410 coupled to the decoder 408. The scheduler circuit(s) may schedule one or more operations associated with decoded instructions, including one or more operations decoded from a store fence multiplication instruction 404, e.g., for execution on the execution circuit 414.

As one example, a decoded store fence multiplication instruction 404 is to cause previous store requests to complete within the memory (e.g., is to cause every store prior to the instruction 404 to be globally visible before any store after the instruction 404 becomes globally visible).

In certain embodiments, a writeback/retirement circuit 420 is included to writeback/retire results of an instruction to a destination (e.g., write them to a register(s) and/or memory), for example, so those results are visible within a processor (e.g., visible outside of the execution circuit that produced those results).

One or more of these components (e.g., decoder 408, register rename/register allocator/scheduler 410, execution circuit 414, registers (e.g., register file)/memory 412, or write back circuit 420) may be in a single core of a hardware processor (e.g., and multiple cores each with an instance of these components).

Figure 5:
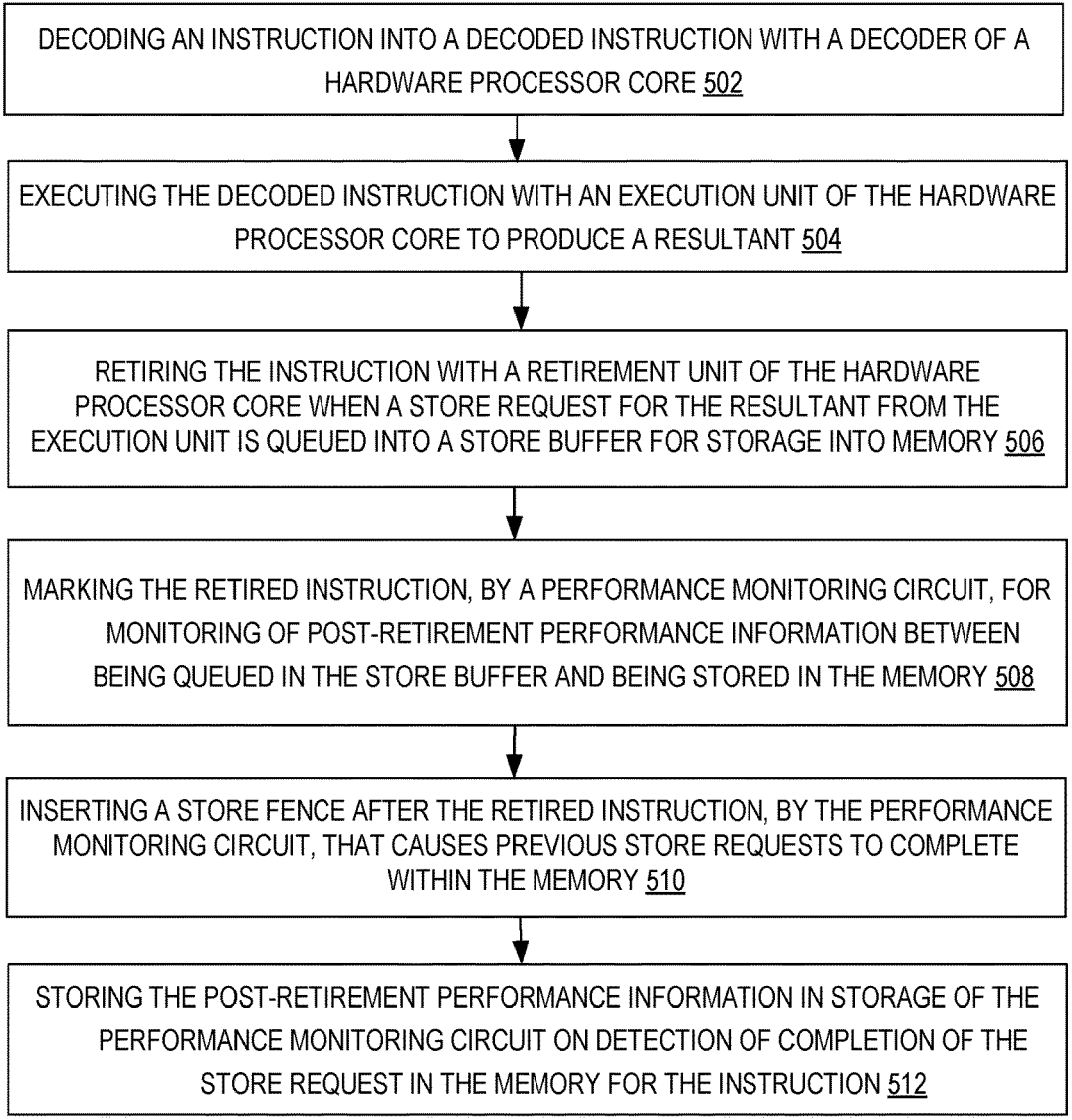
FIG. 5 illustrates a flow diagram according to embodiments of the disclosure.

FIG. 5 illustrates a flow diagram 500 according to embodiments of the disclosure. Depicted flow diagram 500 includes decoding an instruction into a decoded instruction with a decoder of a hardware processor core 502, executing the decoded instruction with an execution circuit of the hardware processor core to produce a resultant 504, retiring the instruction with a retirement circuit of the hardware processor core when a store request for the resultant from the execution circuit is queued into a store buffer for storage into memory 506, marking the retired instruction, by a performance monitoring circuit, for monitoring of post-retirement performance information between being queued in the store buffer and being stored in the memory 508, inserting a store fence after the retired instruction, by the performance monitoring circuit, that causes previous store requests to complete within the memory 510, and storing the post-retirement performance information in storage of the performance monitoring circuit on detection of completion of the store request in the memory for the instruction 512.

Exemplary architectures, systems, etc. that the above may be used in are detailed below.

At least some embodiments of the disclosed technologies can be described in view of the following examples:

Example 1. An apparatus comprising:
a memory;
a hardware processor core comprising:
 a decoder to decode an instruction into a decoded instruction,
 an execution circuit to execute the decoded instruction to produce a resultant,
 a store buffer, and
 a retirement circuit to retire the instruction when a store request for the resultant from the execution circuit is queued into the store buffer (e.g., but not yet stored into its memory destination) for storage into the memory; and
a performance monitoring circuit to:
 mark the retired instruction for monitoring of post-retirement performance information between being queued in the store buffer and being stored in the memory,
 enable a store fence after the retired instruction to be inserted that causes previous (e.g., in-flight) store requests to complete within the memory, and
 on detection of completion of the store request for the instruction in the memory, store the post-retirement performance information in storage of the performance monitoring circuit.

Example 2. The apparatus of example 1, wherein the instruction comprises a plurality of store requests, and the performance monitoring circuit is to enable the store fence for the retired instruction to be inserted after a last store request of the plurality of store requests is queued into the store buffer.

Example 3. The apparatus of example 1, wherein the memory is a cache of the hardware processor core, and when the store request leaves the store buffer for completion in the cache, the performance monitoring circuit is to enable a counter to measure a latency between the store request leaving the store buffer and completion in the cache.

Example 4. The apparatus of example 3, wherein the cache is a next level cache, and the post-retirement performance information indicates a miss for the store request in a previous level cache.

Example 5. The apparatus of example 1, wherein the memory is separate from a cache of the hardware processor core, a fill buffer is to queue the store request when the store request misses in the cache for servicing by the memory, and when the store request leaves the store buffer for completion in the memory, the performance monitoring circuit is to enable a counter to measure a latency between the store request leaving the store buffer and completion in the memory.

Example 6. The apparatus of example 5, wherein the cache is a last level cache of a processor comprising the hardware processor core.

Example 7. The apparatus of example 1, wherein the performance monitoring circuit comprises a sampling counter to cause marking of the retired instruction for monitoring after a threshold number of instructions are retired.

Example 8. The apparatus of example 1, wherein the storage of the performance monitoring circuit is a software visible register.

Example 9. A method comprising:
decoding an instruction into a decoded instruction with a decoder of a hardware processor core;
executing the decoded instruction with an execution circuit of the hardware processor core to produce a resultant;
retiring the instruction with a retirement circuit of the hardware processor core when a store request for the resultant from the execution circuit is queued into a store buffer for storage into memory;
marking the retired instruction, by a performance monitoring circuit, for monitoring of post-retirement performance information between being queued in the store buffer and being stored in the memory;
inserting a store fence after the retired instruction, by the performance monitoring circuit, that causes previous store requests to complete within the memory; and
storing the post-retirement performance information in storage of the performance monitoring circuit on detection of completion of the store request in the memory for the instruction.

Example 10. The method of example 9, wherein the instruction comprises a plurality of store requests, and inserting comprises the performance monitoring circuit inserting the store fence for the retired instruction after a last store request of the plurality of store requests is queued into the store buffer.

Example 11. The method of example 9, wherein the memory is a cache of the hardware processor core, and further comprising enabling a counter of the performance monitoring circuit, when the store request leaves the store buffer for completion in the cache, to measure a latency between the store request leaving the store buffer and completion in the cache.

Example 12. The method of example 11, wherein the cache is a next level cache, and the post-retirement performance information indicates a miss for the store request in a previous level cache.

Example 13. The method of example 9, wherein the memory is separate from a cache of the hardware processor core, and further comprising:
queuing the store request in a fill buffer of the hardware processor core, when the store request misses in the cache, for servicing by the memory; and enabling a counter of the performance monitoring circuit, when the store request leaves the store buffer for completion in the memory, to measure a latency between the store request leaving the store buffer and completion in the memory.

Example 14. The method of example 13, wherein the cache is a last level cache of a processor comprising the hardware processor core.

Example 15. The method of example 9, further comprising:
enabling a counter of the performance monitoring circuit to count a number of instructions that are retired; and
marking the retired instruction for monitoring after the counter exceeds a threshold number of instructions that have been retired.

Example 16. The method of example 9, wherein the storage of the performance monitoring circuit is a software visible register.

Example 17. A non-transitory machine readable medium that stores code that when executed by a machine causes the machine to perform a method comprising:
decoding an instruction into a decoded instruction with a decoder of a hardware processor core;
executing the decoded instruction with an execution circuit of the hardware processor core to produce a resultant;
retiring the instruction with a retirement circuit of the hardware processor core when a store request for the resultant from the execution circuit is queued into a store buffer for storage into memory;
marking the retired instruction, by a performance monitoring circuit, for monitoring of post-retirement performance information between being queued in the store buffer and being stored in the memory;
inserting a store fence after the retired instruction, by the performance monitoring circuit, that causes previous store requests to complete within the memory; and
storing the post-retirement performance information in storage of the performance monitoring circuit on detection of completion of the store request in the memory for the instruction.

Example 18. The non-transitory machine readable medium of example 17, wherein the instruction comprises a plurality of store requests, and inserting comprises the performance monitoring circuit inserting the store fence for the retired instruction after a last store request of the plurality of store requests is queued into the store buffer.

Example 19. The non-transitory machine readable medium of example 17, wherein the memory is a cache of the hardware processor core, and further comprising enabling a counter of the performance monitoring circuit, when the store request leaves the store buffer for completion in the cache, to measure a latency between the store request leaving the store buffer and completion in the cache.

Example 20. The non-transitory machine readable medium of example 19, wherein the cache is a next level cache, and the post-retirement performance information indicates a miss for the store request in a previous level cache.

Example 21. The non-transitory machine readable medium of example 17, wherein the memory is separate from a cache of the hardware processor core, and further comprising:

queuing the store request in a fill buffer of the hardware processor core, when the store request misses in the cache, for servicing by the memory; and
enabling a counter of the performance monitoring circuit, when the store request leaves the store buffer for completion in the memory, to measure a latency between the store request leaving the store buffer and completion in the memory.

Example 22. The non-transitory machine readable medium of example 21, wherein the cache is a last level cache of a processor comprising the hardware processor core.

Example 23. The non-transitory machine readable medium of example 17, further comprising:
enabling a counter of the performance monitoring circuit to count a number of instructions that are retired; and
marking the retired instruction for monitoring after the counter exceeds a threshold number of instructions that have been retired.

Example 24. The non-transitory machine readable medium of example 17, wherein the storage of the performance monitoring circuit is a software visible register.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Instruction Formats

Embodiments of the instruction(s) described herein may be embodied in different formats. Additionally, exemplary systems, architectures, and pipelines are detailed below.

Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 6A:
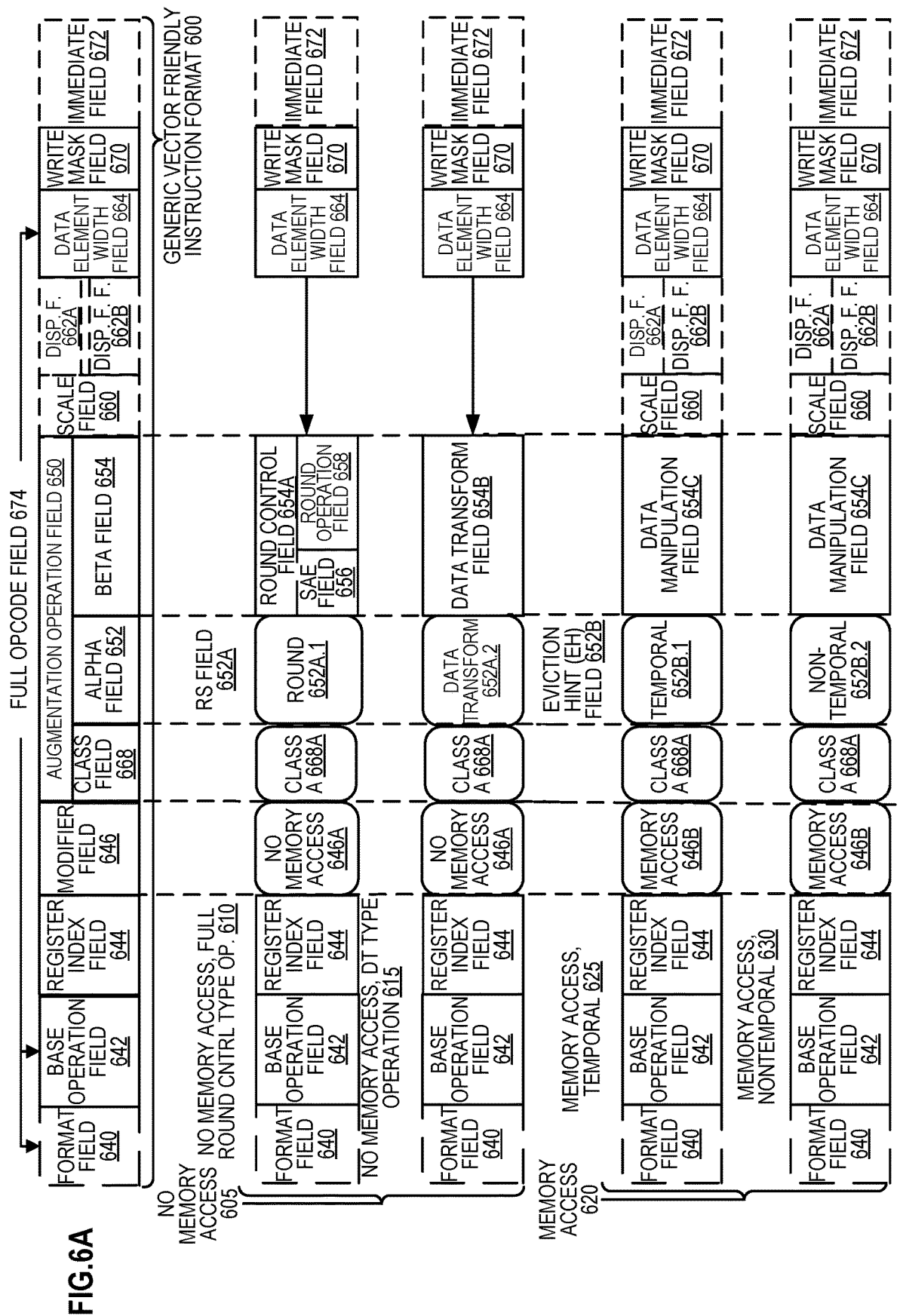
FIG. 6A is a block diagram illustrating a generic vector friendly instruction format and class A instruction templates thereof according to embodiments of the disclosure.
Figure 6B:
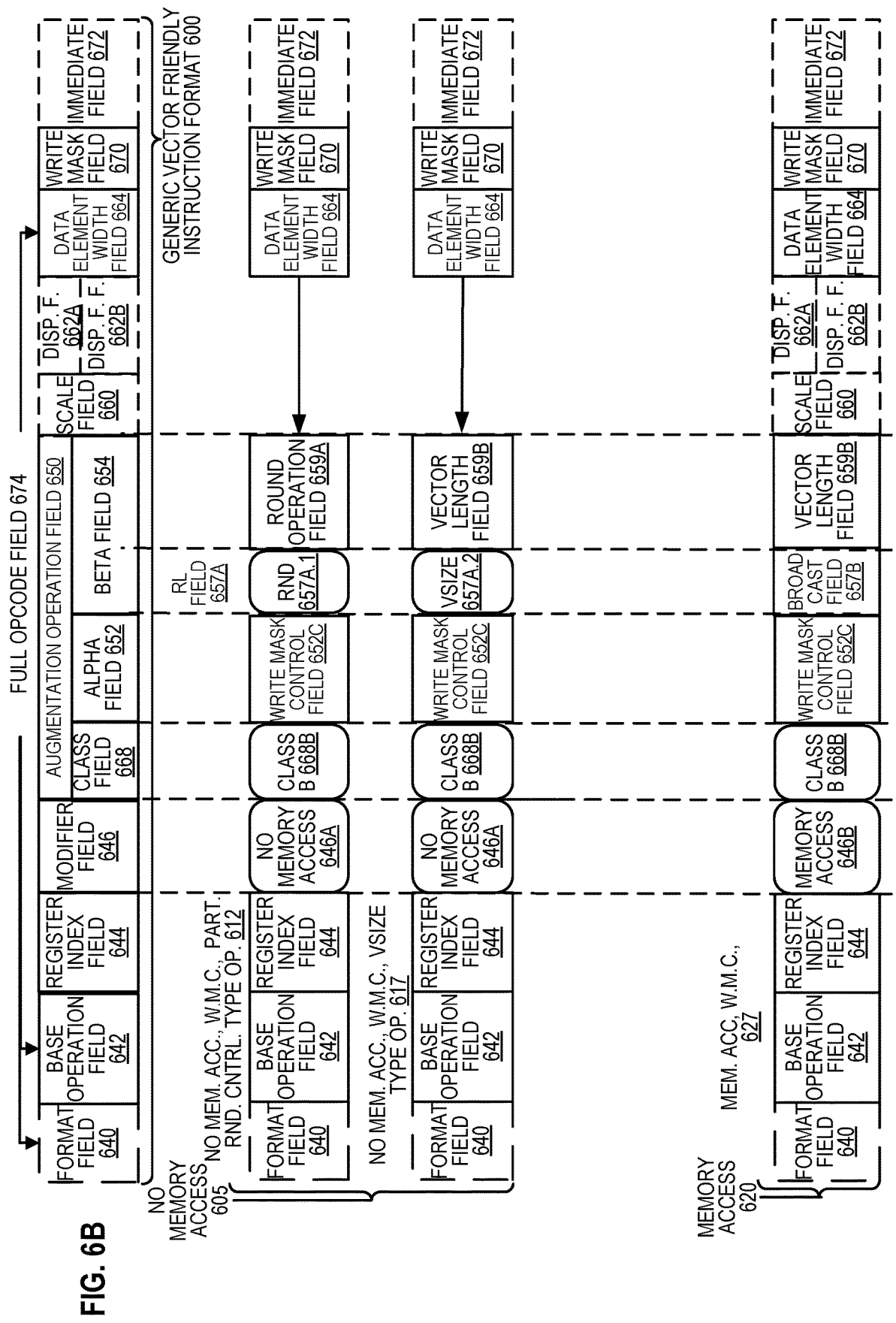
FIG. 6B is a block diagram illustrating the generic vector friendly instruction format and class B instruction templates thereof according to embodiments of the disclosure.

FIGS. 6A-6B are block diagrams illustrating a generic vector friendly instruction format and instruction templates thereof according to embodiments of the disclosure. FIG. 6A is a block diagram illustrating a generic vector friendly instruction format and class A instruction templates thereof according to embodiments of the disclosure; while FIG. 6B is a block diagram illustrating the generic vector friendly instruction format and class B instruction templates thereof according to embodiments of the disclosure. Specifically, a generic vector friendly instruction format 600 for which are defined class A and class B instruction templates, both of which include no memory access 605 instruction templates and memory access 620 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 6A include: 1) within the no memory access 605 instruction templates there is shown a no memory access, full round control type operation 610 instruction template and a no memory access, data transform type operation 615 instruction template; and 2) within the memory access 620 instruction templates there is shown a memory access, temporal 625 instruction template and a memory access, non-temporal 630 instruction template. The class B instruction templates in FIG. 6B include: 1) within the no memory access 605 instruction templates there is shown a no memory access, write mask control, partial round control type operation 612 instruction template and a no memory access, write mask control, vsize type operation 617 instruction template; and 2) within the memory access 620 instruction templates there is shown a memory access, write mask control 627 instruction template.

The generic vector friendly instruction format 600 includes the following fields listed below in the order illustrated in FIGS. 6A-6B.

Format field 640—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 642—its content distinguishes different base operations.

Register index field 644—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 646—its content distinguishes occurrences of instructions in the generic vector instruction format that specify memory access from those that do not; that is, between no memory access 605 instruction templates and memory access 620 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 650—its content distinguishes which one of a variety of different operations to be performed in addition to the base operation. This field is context specific. In one embodiment of the disclosure, this field is divided into a class field 668, an alpha field 652, and a beta field 654. The augmentation operation field 650 allows common groups of operations to be performed in a single instruction rather than 2, 3, or 4 instructions.

Scale field 660—its content allows for the scaling of the index field's content for memory address generation (e.g., for address generation that uses $2^{scale}*\text{index}+\text{base}$).

Displacement Field 662A—its content is used as part of memory address generation (e.g., for address generation that uses $2^{scale}*\text{index}+\text{base}+\text{displacement}$).

Displacement Factor Field 662B (note that the juxtaposition of displacement field 662A directly over displacement factor field 662B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 674 (described later herein) and the data manipulation field 654C. The displacement field 662A and the displacement factor field 662B are optional in the sense that they are not used for the no memory access 605 instruction templates and/or different embodiments may implement only one or none of the two.

Data element width field 664—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 670—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 670 allows for partial vector operations, including loads, stores, arithmetic, logical, etc. While embodiments of the disclosure are described in which the write mask field's 670 content selects one of a number of write mask registers that contains the write mask to be used (and thus the write mask field's 670 content indirectly identifies that masking to be performed), alternative embodiments instead or additional allow the mask write field's 670 content to directly specify the masking to be performed.

Immediate field 672—its content allows for the specification of an immediate. This field is optional in the sense that it is not present in an implementation of the generic vector friendly format that does not support immediate and it is not present in instructions that do not use an immediate.

Class field 668—its content distinguishes between different classes of instructions. With reference to FIGS. 6A-B, the contents of this field select between class A and class B instructions. In FIGS. 6A-B, rounded corner squares are used to indicate a specific value is present in a field (e.g., class A 668A and class B 668B for the class field 668 respectively in FIGS. 6A-B).

Instruction Templates of Class A

In the case of the non-memory access 605 instruction templates of class A, the alpha field 652 is interpreted as an RS field 652A, whose content distinguishes which one of the different augmentation operation types are to be performed (e.g., round 652A.1 and data transform 652A.2 are respectively specified for the no memory access, round type operation 610 and the no memory access, data transform type operation 615 instruction templates), while the beta field 654 distinguishes which of the operations of the specified type is to be performed. In the no memory access 605 instruction templates, the scale field 660, the displacement field 662A, and the displacement scale filed 662B are not present.

No-Memory Access Instruction Templates—Full Round Control Type Operation

In the no memory access full round control type operation 610 instruction template, the beta field 654 is interpreted as a round control field 654A, whose content(s) provide static rounding. While in the described embodiments of the disclosure the round control field 654A includes a suppress all floating point exceptions (SAE) field 656 and a round operation control field 658, alternative embodiments may support may encode both these concepts into the same field or only have one or the other of these concepts/fields (e.g., may have only the round operation control field 658).

SAE field 656—its content distinguishes whether or not to disable the exception event reporting; when the SAE field's 656 content indicates suppression is enabled, a given instruction does not report any kind of floating-point exception flag and does not raise any floating point exception handler.

Round operation control field 658—its content distinguishes which one of a group of rounding operations to perform (e.g., Round-up, Round-down, Round-towards-zero and Round-to-nearest). Thus, the round operation control field 658 allows for the changing of the rounding mode on a per instruction basis. In one embodiment of the disclosure where a processor includes a control register for specifying rounding modes, the round operation control field's 650 content overrides that register value.

No Memory Access Instruction Templates—Data Transform Type Operation

In the no memory access data transform type operation 615 instruction template, the beta field 654 is interpreted as a data transform field 654B, whose content distinguishes which one of a number of data transforms is to be performed (e.g., no data transform, swizzle, broadcast).

In the case of a memory access 620 instruction template of class A, the alpha field 652 is interpreted as an eviction hint field 652B, whose content distinguishes which one of the eviction hints is to be used (in FIG. 6A, temporal 652B.1 and non-temporal 652B.2 are respectively specified for the memory access, temporal 625 instruction template and the memory access, non-temporal 630 instruction template), while the beta field 654 is interpreted as a data manipulation field 654C, whose content distinguishes which one of a number of data manipulation operations (also known as primitives) is to be performed (e.g., no manipulation; broadcast; up conversion of a source; and down conversion of a destination). The memory access 620 instruction templates include the scale field 660, and optionally the displacement field 662A or the displacement scale field 662B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 652 is interpreted as a write mask control (Z) field 652C, whose content distinguishes whether the write masking controlled by the write mask field 670 should be a merging or a zeroing.

In the case of the non-memory access 605 instruction templates of class B, part of the beta field 654 is interpreted as an RL field 657A, whose content distinguishes which one of the different augmentation operation types are to be performed (e.g., round 657A.1 and vector length (VSIZE) 657A.2 are respectively specified for the no memory access, write mask control, partial round control type operation 612 instruction template and the no memory access, write mask control, VSIZE type operation 617 instruction template), while the rest of the beta field 654 distinguishes which of the operations of the specified type is to be performed. In the no memory access 605 instruction templates, the scale field 660, the displacement field 662A, and the displacement scale filed 662B are not present.

In the no memory access, write mask control, partial round control type operation 610 instruction template, the rest of the beta field 654 is interpreted as a round operation field 659A and exception event reporting is disabled (a given instruction does not report any kind of floating-point exception flag and does not raise any floating point exception handler).

Round operation control field 659A—just as round operation control field 658, its content distinguishes which one of a group of rounding operations to perform (e.g., Round-up, Round-down, Round-towards-zero and Round-to-nearest). Thus, the round operation control field 659A allows for the changing of the rounding mode on a per instruction basis. In one embodiment of the disclosure where a processor includes a control register for specifying rounding modes, the round operation control field's 650 content overrides that register value.

In the no memory access, write mask control, VSIZE type operation 617 instruction template, the rest of the beta field 654 is interpreted as a vector length field 659B, whose content distinguishes which one of a number of data vector lengths is to be performed on (e.g., 128, 256, or 512 byte).

In the case of a memory access 620 instruction template of class B, part of the beta field 654 is interpreted as a broadcast field 657B, whose content distinguishes whether or not the broadcast type data manipulation operation is to be performed, while the rest of the beta field 654 is interpreted the vector length field 659B. The memory access 620 instruction templates include the scale field 660, and optionally the displacement field 662A or the displacement scale field 662B.

With regard to the generic vector friendly instruction format 600, a full opcode field 674 is shown including the format field 640, the base operation field 642, and the data element width field 664. While one embodiment is shown where the full opcode field 674 includes all of these fields, the full opcode field 674 includes less than all of these fields in embodiments that do not support all of them. The full opcode field 674 provides the operation code (opcode).

The augmentation operation field 650, the data element width field 664, and the write mask field 670 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 7 is a block diagram illustrating an exemplary specific vector friendly instruction format according to embodiments of the disclosure. FIG. 7 shows a specific vector friendly instruction format 700 that is specific in the sense that it specifies the location, size, interpretation, and order of the fields, as well as values for some of those fields. The specific vector friendly instruction format 700 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 6 into which the fields from FIG. 7 map are illustrated.

It should be understood that, although embodiments of the disclosure are described with reference to the specific vector friendly instruction format 700 in the context of the generic vector friendly instruction format 600 for illustrative purposes, the disclosure is not limited to the specific vector friendly instruction format 700 except where claimed. For example, the generic vector friendly instruction format 600 contemplates a variety of possible sizes for the various fields, while the specific vector friendly instruction format 700 is shown as having fields of specific sizes. By way of specific example, while the data element width field 664 is illustrated as a one bit field in the specific vector friendly instruction format 700, the disclosure is not so limited (that is, the generic vector friendly instruction format 600 contemplates other sizes of the data element width field 664).

The generic vector friendly instruction format 600 includes the following fields listed below in the order illustrated in FIG. 7A.

EVEX Prefix (Bytes 0-3) 702—is encoded in a four-byte form.

Format Field 640 (EVEX Byte 0, bits [7:0])—the first byte (EVEX Byte 0) is the format field 640 and it contains 0x62 (the unique value used for distinguishing the vector friendly instruction format in one embodiment of the disclosure).

The second-fourth bytes (EVEX Bytes 1-3) include a number of bit fields providing specific capability.

REX field 705 (EVEX Byte 1, bits [7-5])—consists of an EVEX.R bit field (EVEX Byte 1, bit [7]—R), EVEX.X bit field (EVEX byte 1, bit [6]—X), and 657BEX byte 1, bit[5]—B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 610—this is the first part of the REX' field 610 and is the EVEX.R' bit field (EVEX Byte 1, bit [4]—R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 715 (EVEX byte 1, bits [3:0]—mmmm)—its content encodes an implied leading opcode byte (0F, 0F 38, or 0F 3).

Data element width field 664 (EVEX byte 2, bit [7]—W)—is represented by the notation EVEX.W. EVEX.W is used to define the granularity (size) of the datatype (either 32-bit data elements or 64-bit data elements).

EVEX.vvvv 720 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 720 encodes the 4 low-order bits of the first source register specifier stored in inverted (1s complement) form. Depending on the instruction, an extra different EVEX bit field is used to extend the specifier size to 32 registers.

EVEX.0 668 Class field (EVEX byte 2, bit [2]—U)—If EVEX.0=0, it indicates class A or EVEX.U0; if EVEX.0=1, it indicates class B or EVEX.U1.

Prefix encoding field 725 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decode circuit's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 652 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 654 (EVEX byte 3, bits [6:4]—SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 610—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 670 (EVEX byte 3, bits [2:0]—kkk)—its content specifies the index of a register in the write mask registers as previously described. In one embodiment of the disclosure, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 730 (Byte 4) is also known as the opcode byte. Part of the opcode is specified in this field.

MOD R/M Field 740 (Byte 5) includes MOD field 742, Reg field 744, and R/M field 746. As previously described, the MOD field's 742 content distinguishes between memory access and non-memory access operations. The role of Reg field 744 can be summarized to two situations: encoding either the destination register operand or a source register operand, or be treated as an opcode extension and not used to encode any instruction operand. The role of R/M field 746 may include the following: encoding the instruction operand that references a memory address, or encoding either the destination register operand or a source register operand.

Scale, Index, Base (SIB) Byte (Byte 6)—As previously described, the scale field's 650 content is used for memory address generation. SIB.xxx 754 and SIB.bbb 756—the contents of these fields have been previously referred to with regard to the register indexes Xxxx and Bbbb.

Displacement field 662A (Bytes 7-10)—when MOD field 742 contains 10, bytes 7-10 are the displacement field 662A, and it works the same as the legacy 32-bit displacement (disp32) and works at byte granularity.

Displacement factor field 662B (Byte 7)—when MOD field 742 contains 1, byte 7 is the displacement factor field 662B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 662B is a reinterpretation of disp8; when using displacement factor field 662B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 662B substitutes the legacy x86 instruction set 8-bit displacement. Thus, the displacement factor field 662B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 672 operates as previously described.

Full Opcode Field

FIG. 7B is a block diagram illustrating the fields of the specific vector friendly instruction format 700 that make up the full opcode field 674 according to one embodiment of the disclosure. Specifically, the full opcode field 674 includes the format field 640, the base operation field 642, and the data element width (W) field 664. The base operation field 642 includes the prefix encoding field 725, the opcode map field 715, and the real opcode field 730.

Register Index Field

FIG. 7C is a block diagram illustrating the fields of the specific vector friendly instruction format 700 that make up the register index field 644 according to one embodiment of the disclosure. Specifically, the register index field 644 includes the REX field 705, the REX' field 710, the MODR/M.reg field 744, the MODR/M.r/m field 746, the VVVV field 720, xxx field 754, and the bbb field 756.

Augmentation Operation Field

Figure 7D:
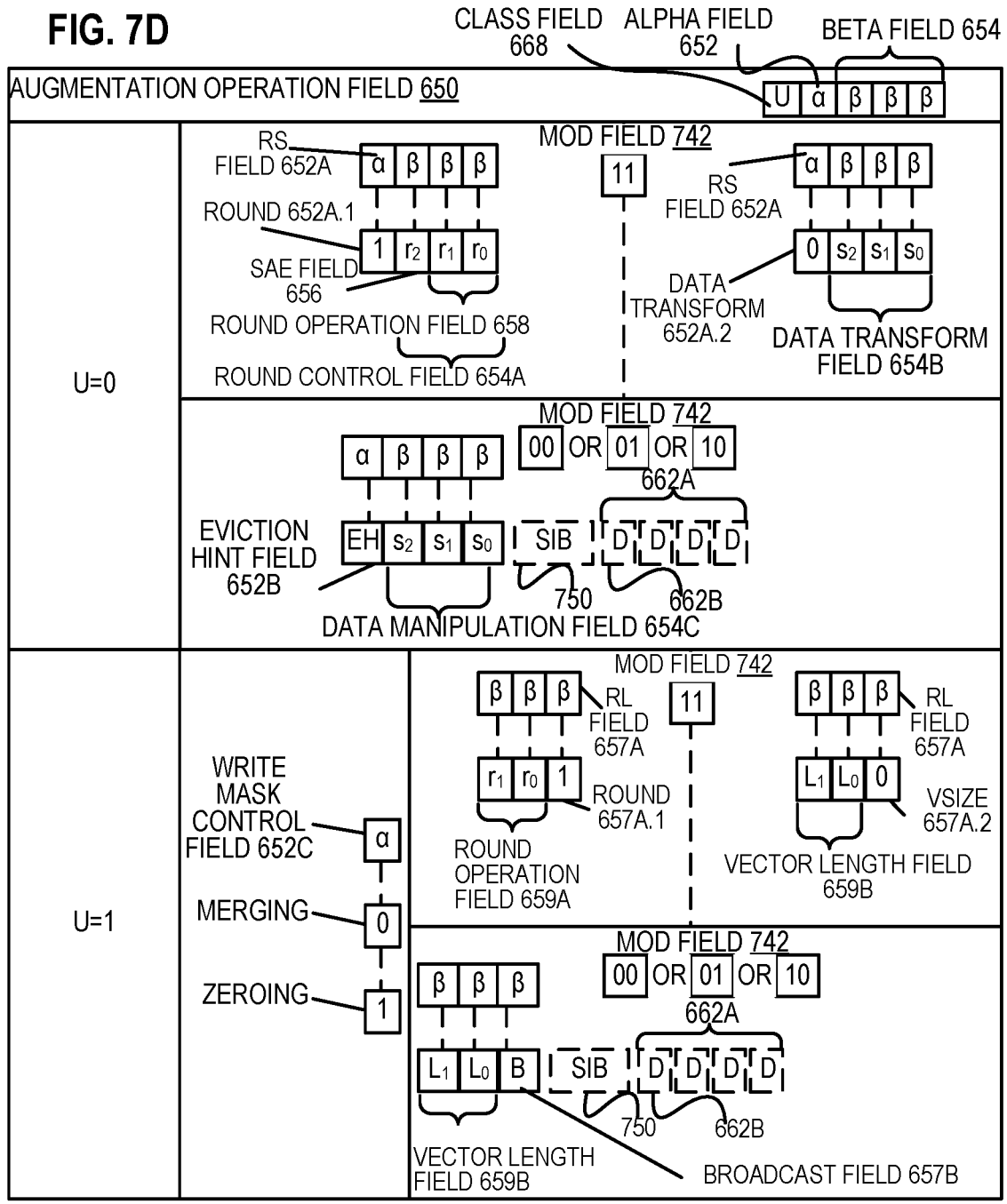
FIG. 7D is a block diagram illustrating the fields of the specific vector friendly instruction format in FIG. 7A that make up the augmentation operation field 650 according to one embodiment of the disclosure.

FIG. 7D is a block diagram illustrating the fields of the specific vector friendly instruction format 700 that make up the augmentation operation field 650 according to one embodiment of the disclosure. When the class (U) field 668 contains 0, it signifies EVEX.U0 (class A 668A); when it contains 1, it signifies EVEX.U1 (class B 668B). When U=0 and the MOD field 742 contains 11 (signifying a no memory access operation), the alpha field 652 (EVEX byte 3, bit [7]—EH) is interpreted as the rs field 652A. When the rs field 652A contains a 1 (round 652A.1), the beta field 654 (EVEX byte 3, bits [6:4]—SSS) is interpreted as the round control field 654A. The round control field 654A includes a one bit SAE field 656 and a two bit round operation field 658. When the rs field 652A contains a 0 (data transform 652A.2), the beta field 654 (EVEX byte 3, bits [6:4]—SSS) is interpreted as a three bit data transform field 654B. When U=0 and the MOD field 742 contains 00, 1, or 10 (signifying a memory access operation), the alpha field 652 (EVEX byte 3, bit [7]—EH) is interpreted as the eviction hint (EH) field 652B and the beta field 654 (EVEX byte 3, bits [6:4]—SSS) is interpreted as a three bit data manipulation field 654C.

When U=1, the alpha field 652 (EVEX byte 3, bit [7]—EH) is interpreted as the write mask control (Z) field 652C. When U=1 and the MOD field 742 contains 11 (signifying a no memory access operation), part of the beta field 654 (EVEX byte 3, bit [4]-$S_0$) is interpreted as the RL field 657A; when it contains a 1 (round 657A.1) the rest of the beta field 654 (EVEX byte 3, bit [6-5]—$S_{2-1}$) is interpreted as the round operation field 659A, while when the RL field 657A contains a 0 (VSIZE 657.A2) the rest of the beta field 654 (EVEX byte 3, bit [6-5]—$S_{2-1}$) is interpreted as the vector length field 659B (EVEX byte 3, bit [6-5]—$L_{1-0}$). When U=1 and the MOD field 742 contains 00, 1, or 10 (signifying a memory access operation), the beta field 654 (EVEX byte 3, bits [6:4]—SSS) is interpreted as the vector length field 659B (EVEX byte 3, bit [6-5]—$L_{1-0}$) and the broadcast field 657B (EVEX byte 3, bit [4]—B).

Exemplary Register Architecture

Figure 8:
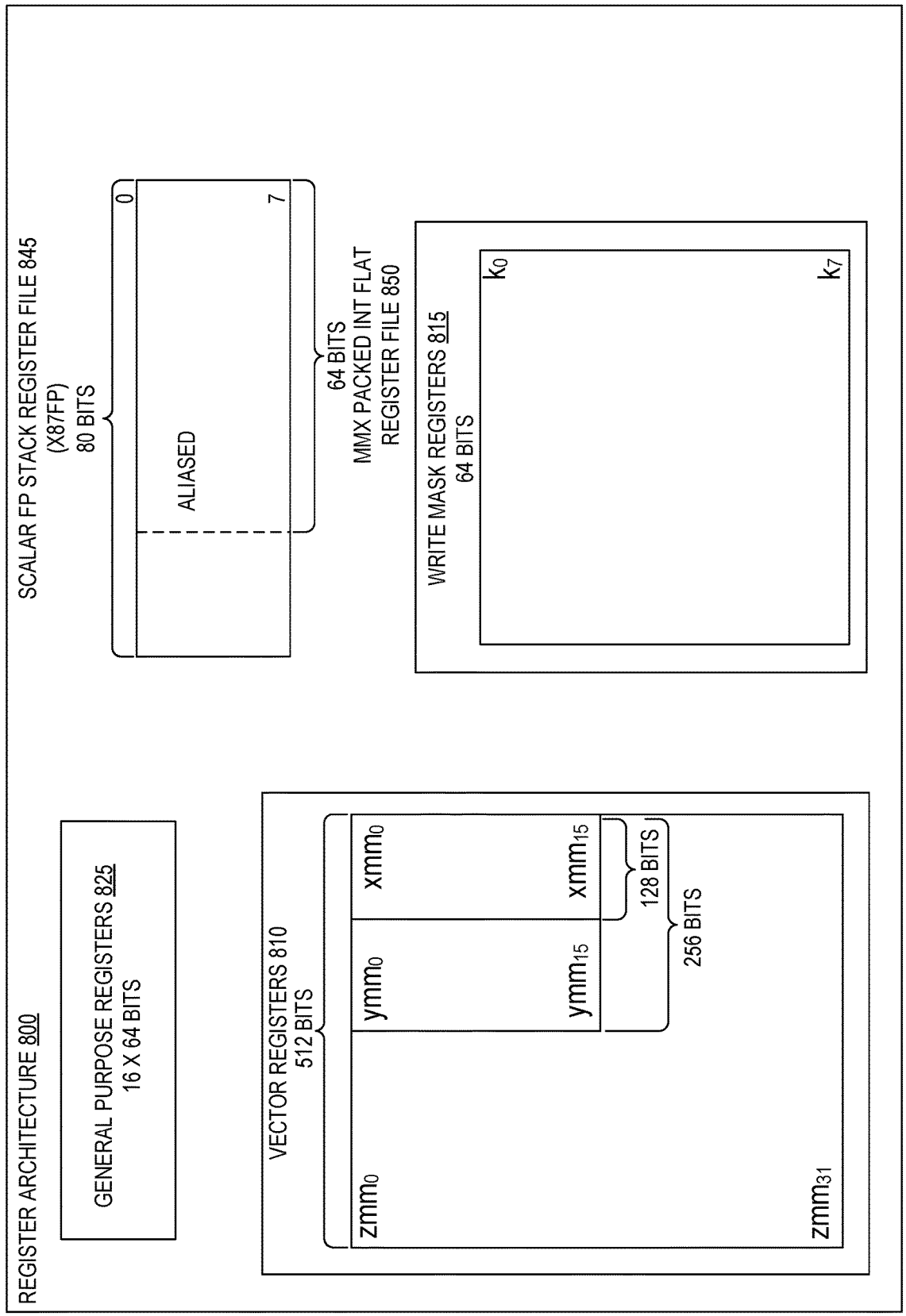
FIG. 8 is a block diagram of a register architecture according to one embodiment of the disclosure.

FIG. 8 is a block diagram of a register architecture 800 according to one embodiment of the disclosure. In the embodiment illustrated, there are 32 vector registers 810 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 700 operates on these overlaid register file as illustrated in the below tables.

| Adjustable Vector Length | Class | Operations | Registers |
|---|---|---|---|
| Instruction Templates that do not include the vector length field 659B | A (FIG. 6A; U = 0) | 610, 615, 625, 630 | zmm registers (the vector length is 64 byte) |
| | B (FIG. 6B; U = 1) | 612 | zmm registers (the vector length is 64 byte) |
| Instruction templates that do include the vector length field 659B | B (FIG. 6B; U = 1) | 617, 627 | zmm, ymm, or xmm registers (the vector length is 64 byte, 32 byte, or 16 byte) depending on the vector length field 659B |

In other words, the vector length field 659B selects between a maximum length and one or more other shorter lengths, where each such shorter length is half the length of the preceding length; and instructions templates without the vector length field 659B operate on the maximum vector length. Further, in one embodiment, the class B instruction templates of the specific vector friendly instruction format 700 operate on packed or scalar single/double-precision floating point data and packed or scalar integer data. Scalar operations are operations performed on the lowest order data element position in a zmm/ymm/xmm register; the higher order data element positions are either left the same as they were prior to the instruction or zeroed depending on the embodiment.

Write mask registers 815—in the embodiment illustrated, there are 8 write mask registers (k0 through k7), each 64 bits in size. In an alternate embodiment, the write mask registers 815 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 825—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 845, on which is aliased the MMX packed integer flat register file 850—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 9A is a block diagram illustrating both an exemplary in-order pipeline and an exemplary register renaming, out-of-order issue/execution pipeline according to embodiments of the disclosure. FIG. 9B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (e.g., decode circuit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macro-instructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 (e.g., execution circuits) and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 10B:
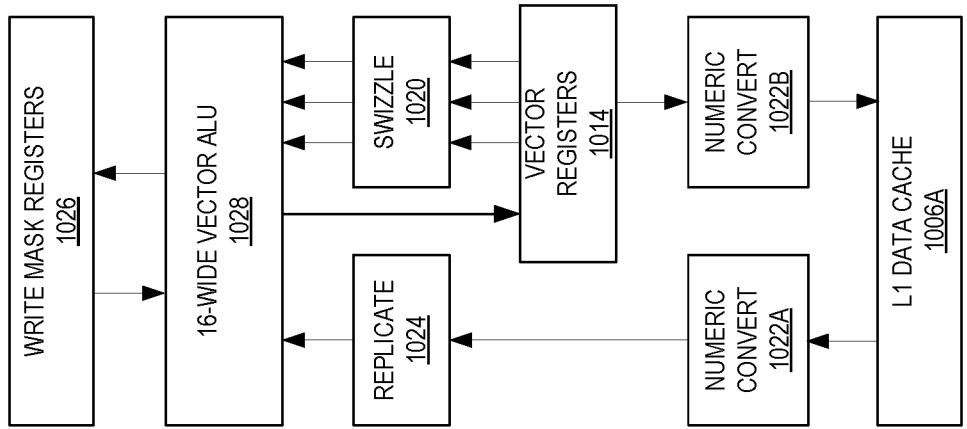
FIG. 10B is an expanded view of part of the processor core in FIG. 10A according to embodiments of the disclosure.
Figure 10A:
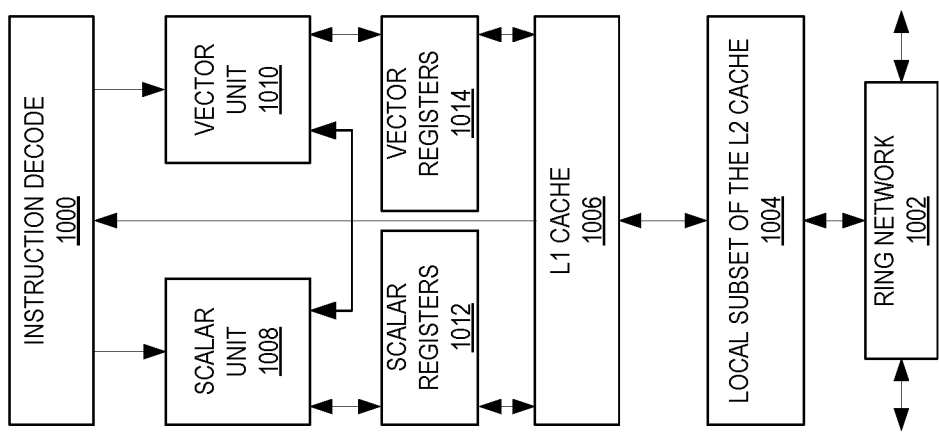
FIG. 10A is a block diagram of a single processor core, along with its connection to the on-die interconnect network and with its local subset of the Level 2 (L2) cache, according to embodiments of the disclosure.

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the disclosure. In one embodiment, an instruction decode unit 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the disclosure may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the disclosure. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 11:
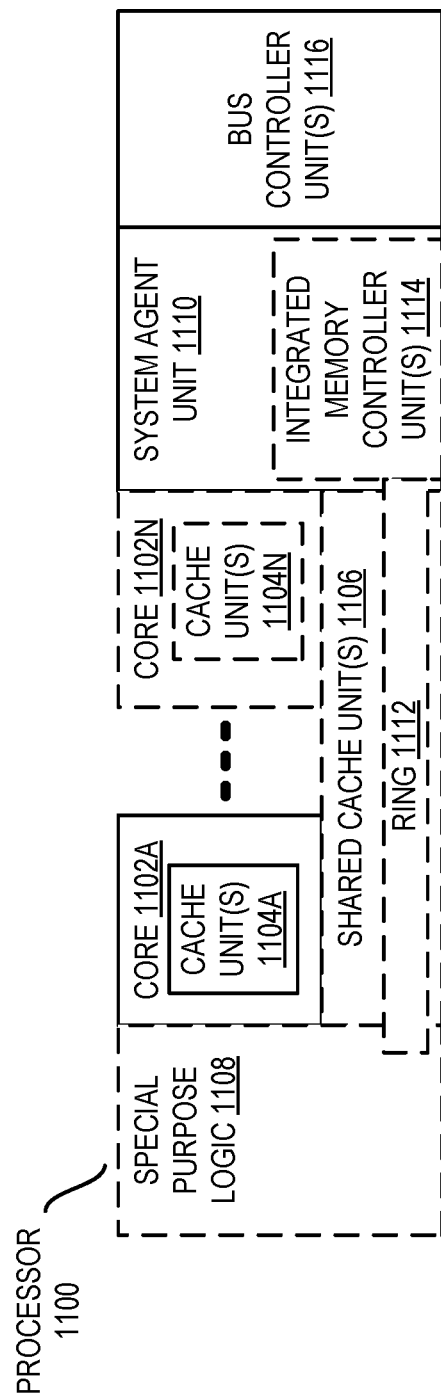
FIG. 11 is a block diagram of a processor that may have more than one core, may have an integrated memory controller, and may have integrated graphics according to embodiments of the disclosure.

FIG. 11 is a block diagram of a processor 1100 that may have more than one core, may have an integrated memory controller, and may have integrated graphics according to embodiments of the disclosure. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multithreading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
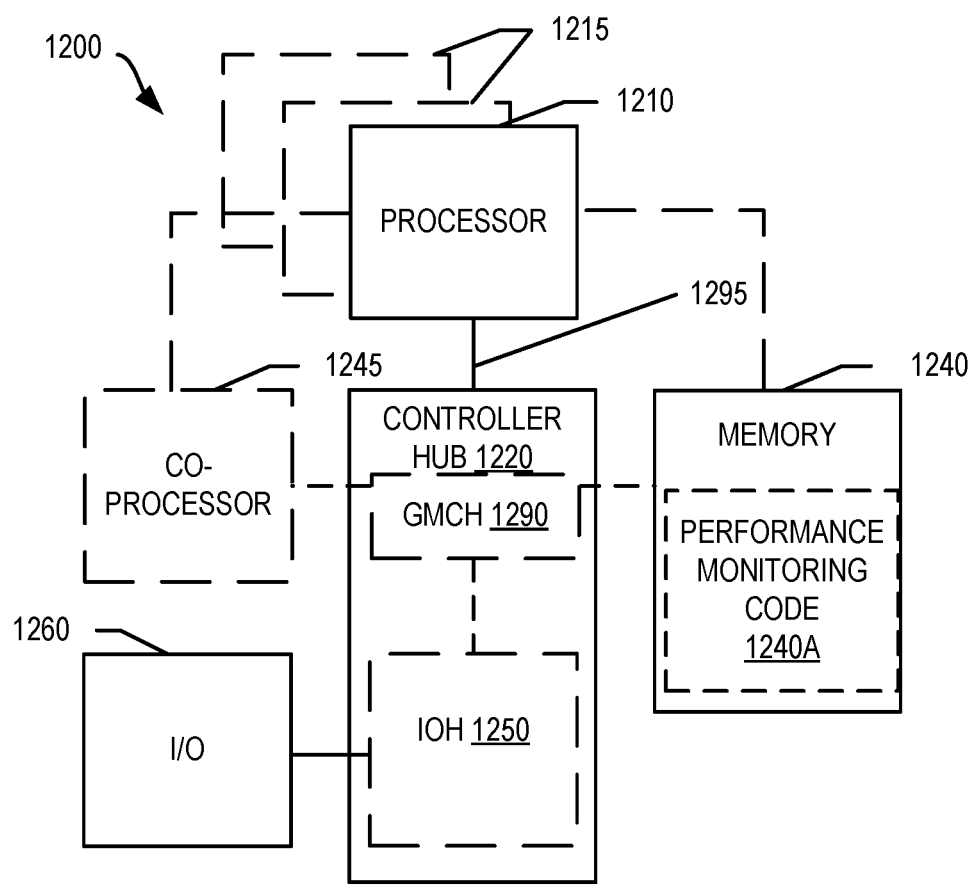
FIG. 12 is a block diagram of a system in accordance with one embodiment of the present disclosure.

Referring now to FIG. 12, shown is a block diagram of a system 1200 in accordance with one embodiment of the present disclosure. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250. Memory 1240 may include performance monitoring code 1240A, for example, to store code that when executed causes a processor to perform any method of this disclosure.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as Quickpath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
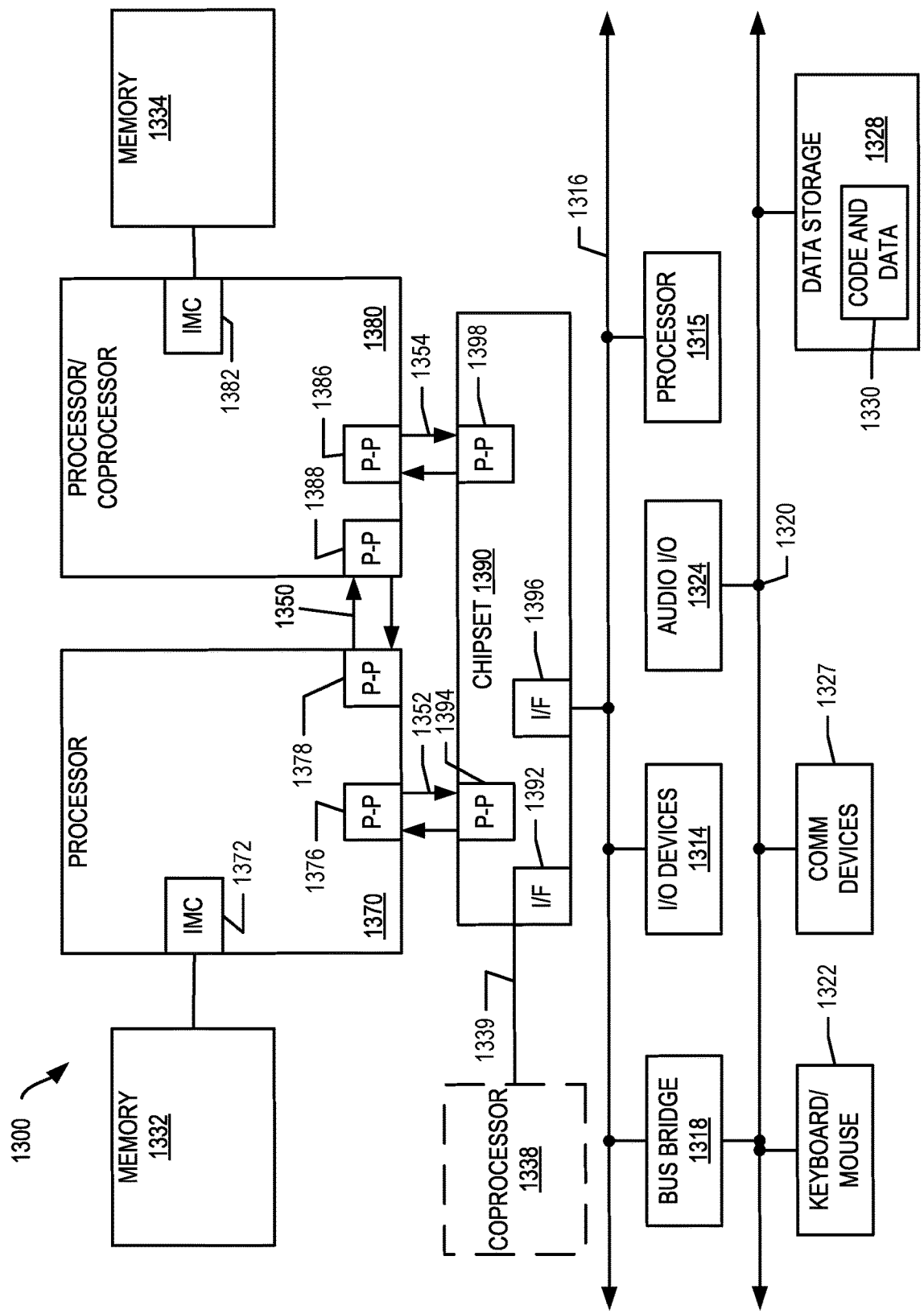
FIG. 13 is a block diagram of a more specific exemplary system in accordance with an embodiment of the present disclosure.

Referring now to FIG. 13, shown is a block diagram of a first more specific exemplary system 1300 in accordance with an embodiment of the present disclosure. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the disclosure, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present disclosure is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
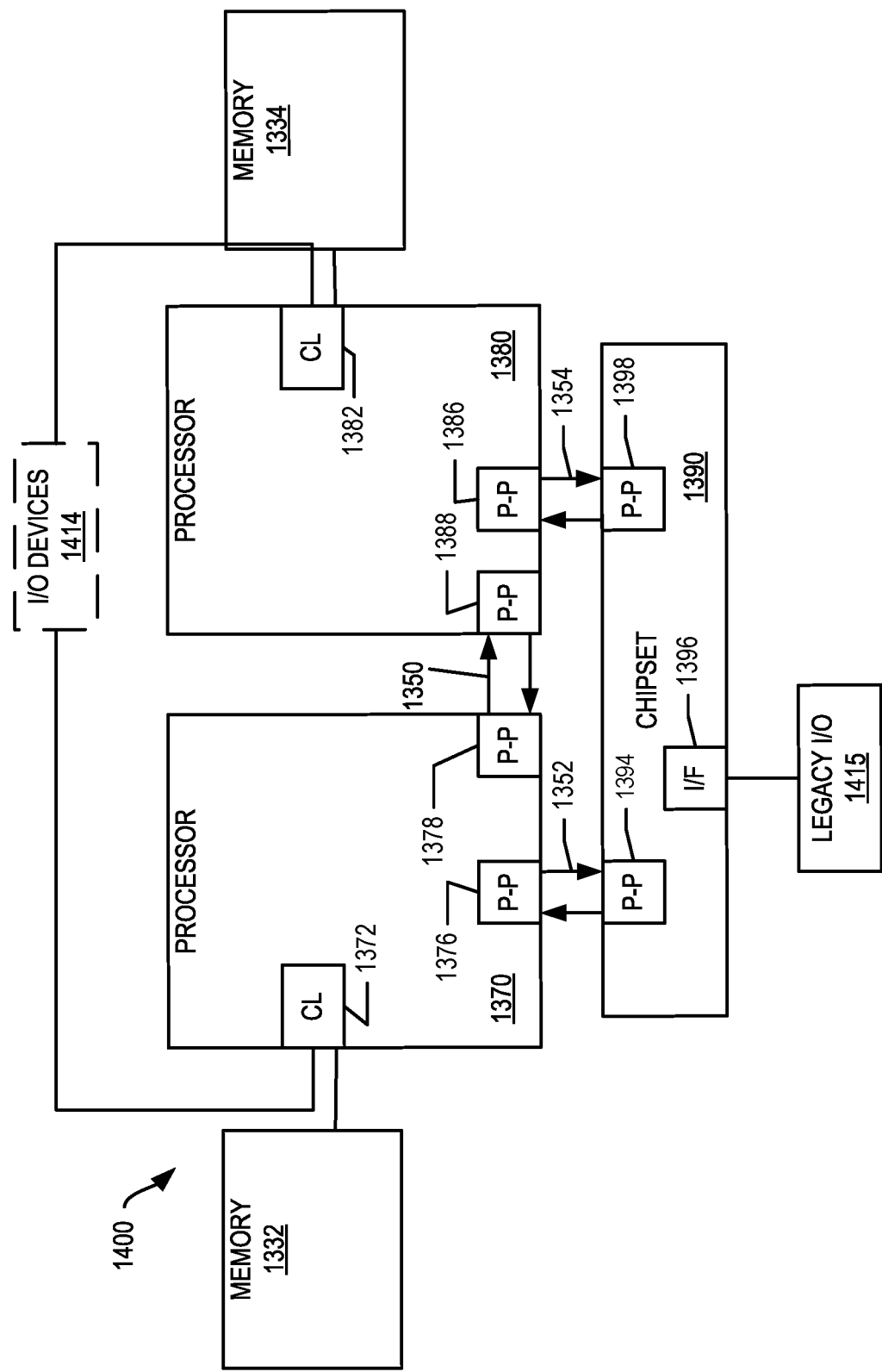
FIG. 14, shown is a block diagram of a second more specific exemplary system in accordance with an embodiment of the present disclosure.

Referring now to FIG. 14, shown is a block diagram of a second more specific exemplary system 1400 in accordance with an embodiment of the present disclosure. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
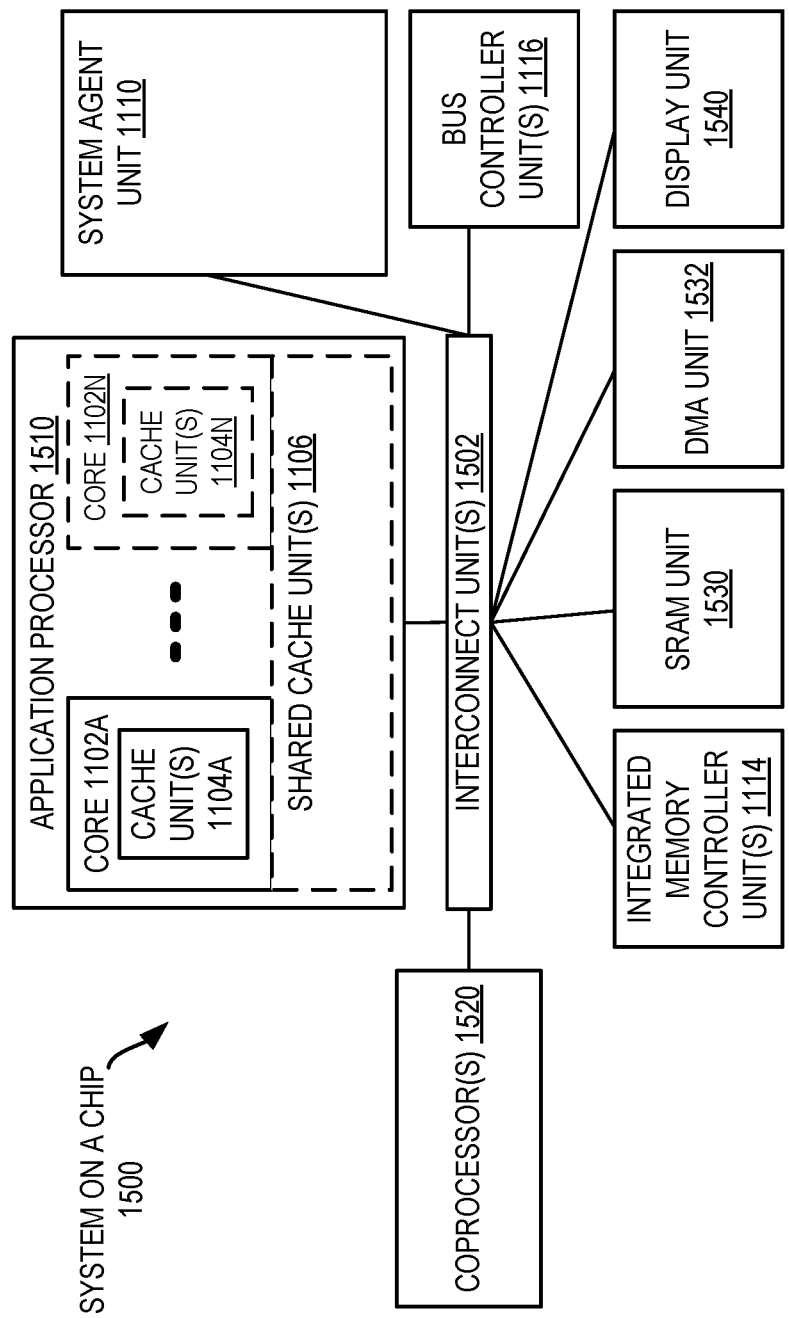
FIG. 15, shown is a block diagram of a system on a chip (SoC) in accordance with an embodiment of the present disclosure.

Referring now to FIG. 15, shown is a block diagram of a SoC 1500 in accordance with an embodiment of the present disclosure. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 202A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
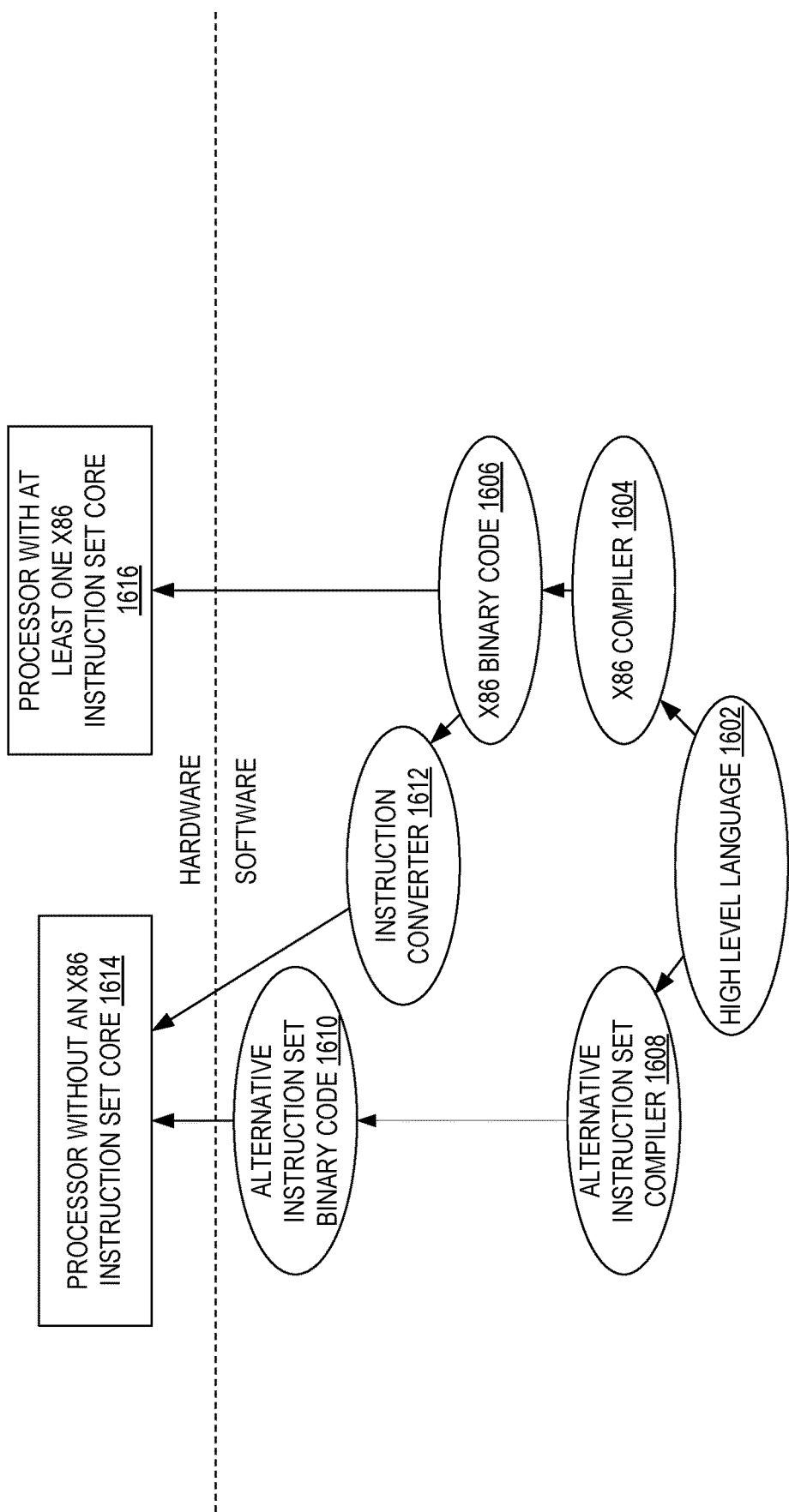
FIG. 16 is a block diagram contrasting the use of a software instruction converter to convert binary instructions in a source instruction set to binary instructions in a target instruction set according to embodiments of the disclosure.

FIG. 16 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, CA and/or that execute the ARM instruction set of ARM Holdings of Sunnyvale, CA). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

What is claimed is:

1. An apparatus comprising:
   a decoder to decode an instruction into a decoded instruction;
   an execution circuit to execute the decoded instruction to produce a resultant;
   a first level data cache;
   a store buffer;
   a retirement circuit to retire the instruction when a store request for the resultant is queued into the store buffer for storage into a memory but is not yet completed to the memory; and
   a performance monitoring circuit to:
      monitor post-retirement performance information of the retired instruction between the store request being accepted into the first level data cache and being completed to the memory, and
      store the post-retirement performance information in storage of the performance monitoring circuit.

2. The apparatus of claim 1, wherein the performance monitoring circuit is to monitor and store in response to the performance monitoring circuit being in precise event-based sampling mode.

3. The apparatus of claim 1, wherein, when the store request is accepted into the first level data cache, the performance monitoring circuit is to enable a counter to measure a latency between the store request being accepted into the first level data cache and being completed in the memory, and the post-retirement performance information comprises the latency from the counter.

4. The apparatus of claim 1, wherein the post-retirement performance information comprises a value to indicate the store request is a locked access.

5. The apparatus of claim 1, wherein the memory is another level of cache.

6. The apparatus of claim 1, wherein the memory is a system memory separate from any cache of the apparatus.

7. The apparatus of claim 1, wherein the translation lookaside buffer is a second level translation lookaside buffer.

8. The apparatus of claim 7, wherein the post-retirement performance information comprises a value to indicate the store request is a locked access.

9. The apparatus of claim 1, wherein the post-retirement performance information comprises a linear address of a destination in the memory of the store request.

10. A method comprising:
decoding an instruction into a decoded instruction with a decoder of a hardware processor comprising a first level data cache and a store buffer;
executing the decoded instruction with an execution circuit of the hardware processor to produce a resultant;
retiring the instruction with a retirement circuit of the hardware processor when a store request for the resultant is queued into the store buffer for storage into a memory but is not yet completed to the memory;
monitoring, by a performance monitoring circuit of the hardware processor, post-retirement performance information of the retired instruction between the store request being accepted into the first level data cache and being completed to the memory, wherein the post-retirement performance information comprises a first value to indicate the store request missed in the first level data cache and a second value to indicate the store request missed in a translation lookaside buffer; and
storing, by the performance monitoring circuit, the post-retirement performance information in storage of the performance monitoring circuit.

11. The method of claim 10, wherein the monitoring and the storing occur in response to the performance monitoring circuit being in precise event-based sampling mode.

12. The method of claim 10, further comprising, when the store request is accepted into the first level data cache, enabling, by the performance monitoring circuit, a counter to measure a latency between the store request being accepted into the first level data cache and being completed in the memory, wherein the post-retirement performance information comprises the latency from the counter.

13. The method of claim 10, wherein the post-retirement performance information comprises a value to indicate the store request is a locked access.

14. The method of claim 10, wherein the memory is another level of cache.

15. The method of claim 10, wherein the memory is a system memory separate from any cache of the hardware processor.

16. The method of claim 10, wherein the translation lookaside buffer is a second level translation lookaside buffer.

17. The method of claim 16, wherein the post-retirement performance information comprises a value to indicate the store request is a locked access.

18. The method of claim 10, wherein the post-retirement performance information comprises a linear address of a destination in the memory of the store request.

19. A system comprising:
a memory;
a decoder to decode an instruction into a decoded instruction;
an execution circuit to execute the decoded instruction to produce a resultant;
a first level data cache;
a store buffer;
a retirement circuit to retire the instruction when a store request for the resultant is queued into the store buffer for storage into the memory but is not yet completed to the memory; and
a performance monitoring circuit to:
monitor post-retirement performance information of the retired instruction between the store request being accepted into the first level data cache and being completed to the memory, wherein the post-retirement performance information comprises a first value to indicate the store request missed in the first level data cache and a second value to indicate the store request missed in a translation lookaside buffer, and
store the post-retirement performance information in storage of the performance monitoring circuit.

20. The system of claim 19, wherein the performance monitoring circuit is to monitor and store in response to the performance monitoring circuit being in precise event-based sampling mode.

21. The system of claim 19, wherein, when the store request is accepted into the first level data cache, the performance monitoring circuit is to enable a counter to measure a latency between the store request being accepted into the first level data cache and being completed in the memory, and the post-retirement performance information comprises the latency from the counter.

22. The system of claim 19, wherein the post-retirement performance information comprises a value to indicate the store request is a locked access.

23. The system of claim 19, wherein the memory is another level of cache.

24. The system of claim 19, wherein the memory is a system memory separate from any cache.

25. The system of claim 19, wherein the translation lookaside buffer is a second level translation lookaside buffer.

26. The system of claim 25, wherein the post-retirement performance information comprises a value to indicate the store request is a locked access.

27. The system of claim 19, wherein the post-retirement performance information comprises a linear address of a destination in the memory of the store request.

* * * * *